US012025705B2

(12) United States Patent
Kubota et al.

(10) Patent No.: US 12,025,705 B2
(45) Date of Patent: Jul. 2, 2024

(54) DISTANCE MEASURING DEVICE, DISTANCE MEASURING METHOD, AND SPEED MEASURING DEVICE

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Nobu Matsumoto, Ebina (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 588 days.

(21) Appl. No.: 17/001,882

(22) Filed: Aug. 25, 2020

(65) Prior Publication Data

US 2021/0063575 A1    Mar. 4, 2021

(30) Foreign Application Priority Data

Aug. 29, 2019 (JP) ................. 2019-157008

(51) Int. Cl.
*G01S 17/00* (2020.01)
*G01S 7/4865* (2020.01)
(Continued)

(52) U.S. Cl.
CPC ............ *G01S 17/58* (2013.01); *G01S 7/4865* (2013.01); *G01S 17/10* (2013.01); *G01S 17/931* (2020.01)

(58) Field of Classification Search
USPC ....................................................... 356/5.01
See application file for complete search history.

(56) References Cited

U.S. PATENT DOCUMENTS 5,357,331 A    10/1994    Flockencier
7,136,753 B2 *  11/2006    Samukawa ............... B60T 7/22
                                                            356/28
(Continued)

FOREIGN PATENT DOCUMENTS

CN    105679252 B  *  5/2018
JP    2004-198323 A    7/2004
(Continued)

OTHER PUBLICATIONS

European Search Report and Search Opinion for Application EP 20191926 (11 pages) (Year: 2020).*
(Continued)

*Primary Examiner* — James R Hulka
(74) *Attorney, Agent, or Firm* — Oblon, McClelland, Maier & Neustadt, L.L.P.

(57) ABSTRACT

A distance measuring device is a distance measuring device that performs processing on a time-series luminance signal generated on the basis of a sensor output corresponding to reflected light of laser light. The distance measuring device includes a storage circuit and a determination circuit. The storage circuit stores a first time-series luminance signal based on reflected light from a first measurement target of laser light and a second time-series luminance signal based on reflected light from a second measurement target of laser light. The determination circuit determines, on the basis of correlation between the first time-series luminance signal and the second time-series luminance signal, whether the first measurement target and the second measurement target are the same measurement target.

19 Claims, 17 Drawing Sheets

(51) Int. Cl.
   *G01S 17/10*   (2020.01)
   *G01S 17/58*   (2006.01)
   *G01S 17/931*  (2020.01)

(56) References Cited

U.S. PATENT DOCUMENTS

| | | | | |
|---|---|---|---|---|
| 7,215,826 | B1* | 5/2007 | Nevis | G01S 17/89 |
| | | | | 382/260 |
| 7,965,384 | B2* | 6/2011 | Drinkard | G01S 7/4817 |
| | | | | 356/5.1 |
| 9,841,495 | B2 | 12/2017 | Campbell et al. | |
| 10,082,564 | B2* | 9/2018 | Suzuki | G01S 7/4865 |
| 10,217,364 | B2 | 2/2019 | Schwindt et al. | |
| 10,401,482 | B2* | 9/2019 | Kienzler | G01S 17/10 |
| 10,583,737 | B2* | 3/2020 | Chiba | G01S 17/931 |
| 10,739,456 | B2* | 8/2020 | Kubota | G01S 7/484 |
| 2004/0174294 | A1* | 9/2004 | Arnold | G01S 13/588 |
| | | | | 342/104 |
| 2007/0032953 | A1* | 2/2007 | Samukawa | G01S 7/4802 |
| | | | | 701/301 |
| 2008/0224893 | A1 | 9/2008 | Mitani | |
| 2009/0045999 | A1* | 2/2009 | Samukawa | G01S 17/931 |
| | | | | 342/70 |
| 2009/0086189 | A1* | 4/2009 | Drinkard | G01S 7/4873 |
| | | | | 356/5.01 |
| 2012/0130215 | A1* | 5/2012 | Fine | A61B 5/14535 |
| | | | | 600/479 |
| 2015/0099973 | A1* | 4/2015 | Abe | A61B 5/0095 |
| | | | | 600/440 |
| 2016/0209499 | A1 | 7/2016 | Suzuki | |
| 2017/0131387 | A1* | 5/2017 | Campbell | G01S 17/42 |
| 2017/0184709 | A1 | 6/2017 | Kienzler et al. | |
| 2017/0363740 | A1 | 12/2017 | Kubota et al. | |
| 2018/0025645 | A1 | 1/2018 | Schwindt et al. | |
| 2018/0055429 | A1* | 3/2018 | Machida | A61B 5/0295 |
| 2018/0114126 | A1* | 4/2018 | Das | G06F 3/0482 |
| 2018/0361854 | A1 | 12/2018 | Chiba et al. | |
| 2019/0286806 | A1* | 9/2019 | Robinson | H04L 63/0853 |
| 2020/0292677 | A1 | 9/2020 | Kubota et al. | |
| 2020/0342731 | A1* | 10/2020 | Ryder | G08B 17/00 |
| 2020/0366887 | A1* | 11/2020 | Schowengerdt | G02B 27/0093 |
| 2021/0026012 | A1* | 1/2021 | Kubota | G01S 7/4817 |

FOREIGN PATENT DOCUMENTS

| | | |
|---|---|---|
| JP | 2016-133341 A | 7/2016 |
| JP | 2017-539009 A | 12/2017 |
| JP | 2018-533026 A | 11/2018 |
| JP | 2019-2769 A | 1/2019 |
| JP | 2020-148670 A | 9/2020 |
| WO | WO 2009/059391 A1 | 5/2009 |

OTHER PUBLICATIONS

Tanabe, K. et al., "Inter-Frame Smart-Accumulation Technique for Long-Range and High-Pixel Resolution LiDAR," Proc. IEEE Cool Chips, Apr. 2019, 3 pages.

U.S. Appl. No. 16/567,707, filed Sep. 11, 2019, Hiroshi Kubota, et al.

* cited by examiner

DISTANCE MEASURING DEVICE, DISTANCE MEASURING METHOD, AND SPEED MEASURING DEVICE

CROSS-REFERENCE TO RELATED APPLICATIONS

This application is based upon and claims the benefit of priority from the prior Japanese Patent Application No. 2019-157008, filed on Aug. 29, 2019 the entire contents of which are incorporated herein by reference.

FIELD

Embodiments of the present invention relate to a distance measuring device, a distance measuring method, and a speed measuring device.

BACKGROUND

There is known a distance measuring device called LIDAR (Light Detection and Ranging, Laser Imaging Detection and Ranging). The distance measuring device irradiates laser light on a measurement target object and converts the intensity of reflected light reflected by the measurement target object into a time-series luminance signal on the basis of an output of a sensor. Consequently, the distance to the measurement target object is measured on the basis of a time difference between a point in time of emission of the laser light and a point in time corresponding to a peak of a luminance signal value.

In this distance measuring device, speed measurement for the measurement target is attempted using a plurality of time-series luminance signals measured at different points in time. However, the plurality of time-series luminance signals are sometimes not time-series luminance signals based on reflected light from the same measurement target. There is a risk, therefore, that the speed measurement may be mistaken or accuracy of the speed measurement may be deteriorated.

DETAILED DESCRIPTION

Figure 1:
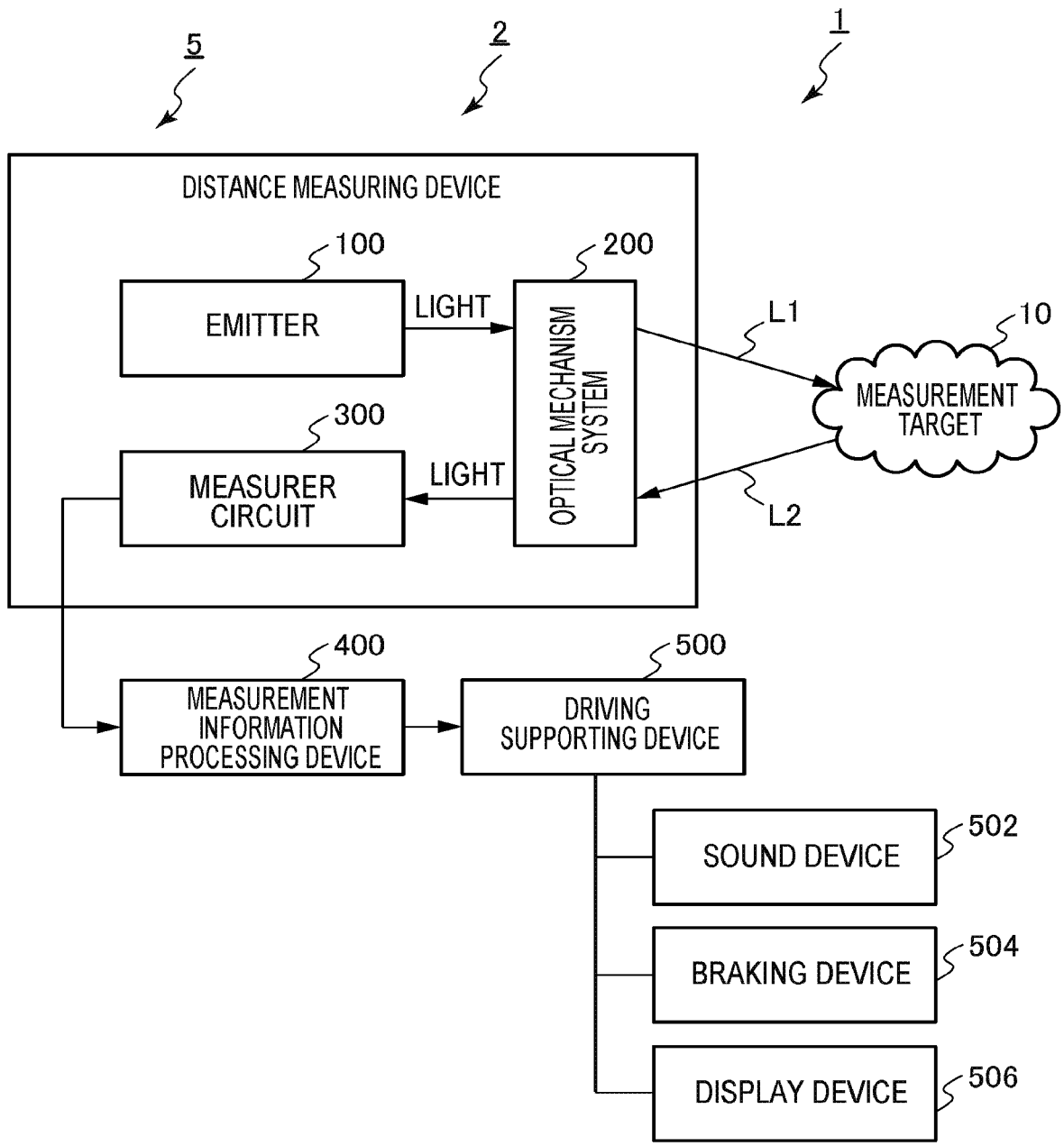
FIG. 1 depicts a diagram showing a schematic overall configuration of a driving supporting system according to an embodiment.

A distance measuring device according to an embodiment is a distance measuring device that performs processing on a time-series luminance signal generated on the basis of a sensor output corresponding to reflected light of laser light. The distance measuring device includes a storage circuit and a determination circuit. The storage circuit stores a first time-series luminance signal based on reflected light from a first measurement target of laser light and a second time-series luminance signal based on reflected light from a second measurement target of laser light. The determination circuit determines, on the basis of correlation between the first time-series luminance signal and the second time-series luminance signal, whether the first measurement target and the second measurement target are the same measurement target.

A distance measurement device and a distance measuring method according to an embodiment of the present invention are explained in detail below with reference to the drawings. Note that the embodiments explained below are examples of embodiments of the present invention. The present invention is not interpreted to be limited to the embodiments. In the drawings referred to in the embodiments, the same parts and parts having the same functions are denoted by the same or similar reference numerals and signs. Repeated explanation of the portions is sometimes omitted. Dimension ratios of the drawings are sometimes different from actual ratios for convenience of explanation. A part of components is sometimes omitted from the drawings.

First Embodiment

A distance measuring device according to a first embodiment evaluates correlation between a first time-series luminance signal of a preceding frame and a second time-series luminance signal of a present frame and, when determining that the first time-series luminance signal and the second time-series luminance signal are time-series luminance signals based on the same measurement target, calculates speed based on the first and second time-series luminance signals to thereby suppress speed measurement from being mistaken or accuracy of the speed measurement from being deteriorated. The distance measuring device is explained more in detail below. Note that the preceding frame according to this embodiment corresponds to the first frame. The present frame corresponds to the second frame.

FIG. 1 is a diagram showing a schematic overall configuration of a driving supporting system 1 according to an embodiment. As shown in FIG. 1, the driving supporting system 1 performs driving support based on a distance image. The driving supporting system 1 includes a distance measuring system 2, driving supporting device 500, a sound device 502, a braking device 504, and a display device 506. The distance measuring system 2 generates a distance image of a measurement target object 10 and includes a distance measuring device 5 and a measurement information processing device 400.

The distance measuring device 5 measures a distance to the measurement target object 10 using a scanning scheme or a TOF (Time Of Flight) scheme. More specifically, the distance measuring device 5 includes an emitter 100, an optical mechanism system 200, and a measurement circuit 300.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurement circuit 300. The laser light means light having a phase and a frequency almost aligned. The reflected light L2 means light in a predetermined direction among scattered lights by the laser light L1.

The measurement circuit 300 measures the distance to the measurement target object 10 on the basis of the reflected light L2 received via the optical mechanism system 200. That is, the measurement circuit 300 measures the distance to the measurement target object 10 on the basis of a time difference between a point in time when the emitter 100 irradiates the laser light L1 on the measurement target object 10 and a point in time when the reflected light L2 is measured.

The measurement circuit 300 measures relative speed on the basis of distance fluctuation per unit time of the distance to the measurement target 10. Speed is obtained by subtracting the speed of the distance measuring device 5 from the relative speed. That is, when the distance measuring device 5 is stopped, the relative speed is the speed. Accordingly, in this embodiment, the relative speed, the speed, a difference value of a distance value, and the like are sometimes referred to as values concerning the speed.

The measurement information processing device 400 performs noise reduction processing and outputs distance image data on the basis of distances to a plurality of measurement points on the measurement target object 10. A part or all of the measurement information processing device 400 may be incorporated in a housing of the distance measuring device 5.

The driving supporting device 500 supports driving of a vehicle according to an output signal of the measurement information processing device 400. The sound device 502, the braking device 504, the display device 506, and the like are connected to the driving supporting device 500.

The sound device 502 is, for example, a speaker and is dispose in a position audible from a driver's seat in the vehicle. The driving supporting device 500 causes, on the basis of an output signal of the measurement information processing device 400, for example, the sound device 502 to generate sound such as "five meter to a target object". Consequently, for example, even when attention of the driver decreases, it is possible to cause the driver to hear the sound to call the attention of the driver.

The braking device 504 is, for example, an auxiliary brake. The driving supporting device 500 causes, on the basis of an output signal of the measurement information processing device 400, the braking device 504 to brake the vehicle, for example, when the target object approaches a predetermined distance, for example, 3 meters to the vehicle.

The display device 506 is, for example, a liquid crystal monitor. The driving supporting device 500 displays an image on the display device 506 on the basis of an output signal of the measurement information processing device 400. Consequently, for example, even at the time of backlight, it is possible to accurately grasp external information by referring to the image displayed on the display device 506.

Figure 2:
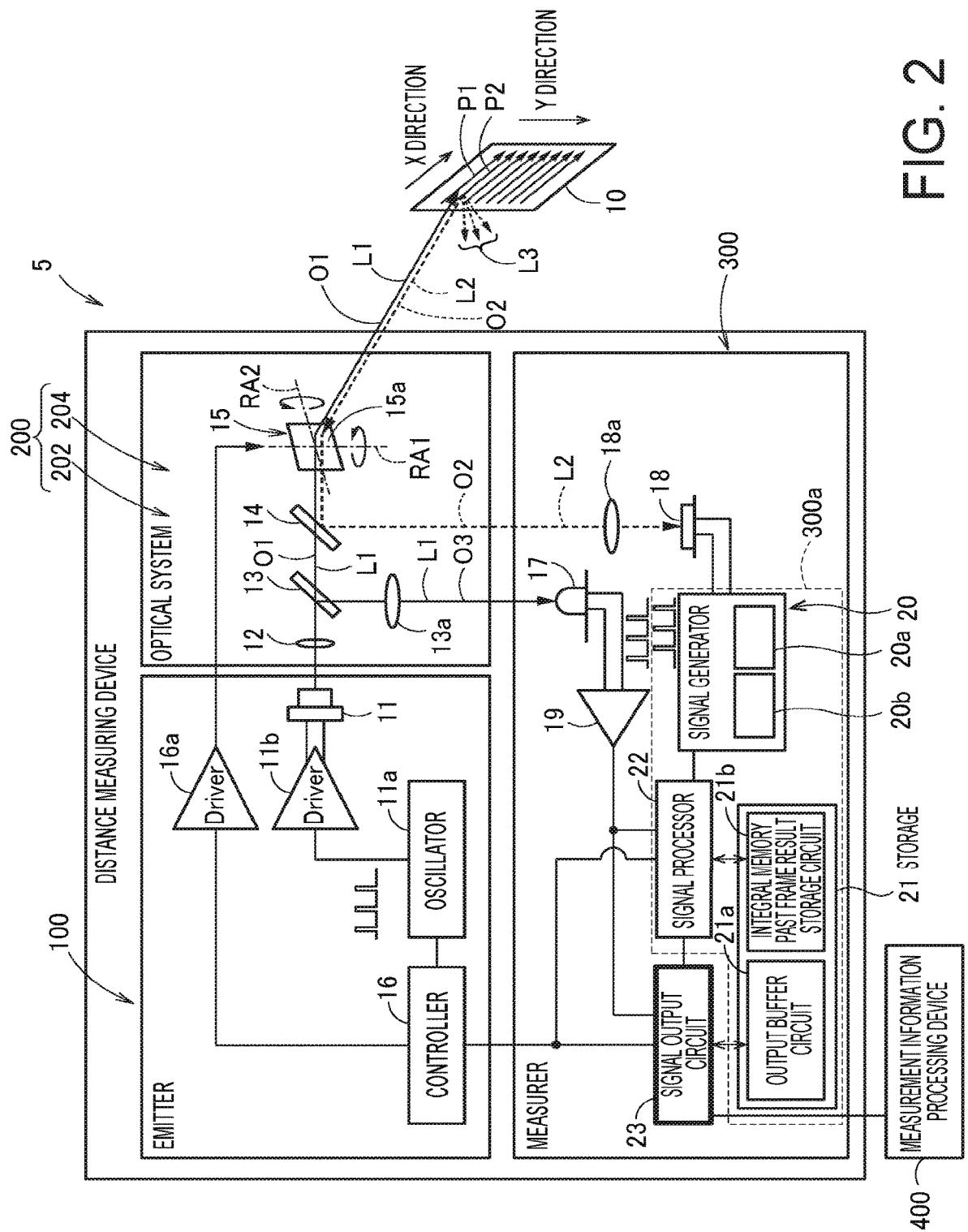
FIG. 2 depicts a diagram showing a configuration example of a distance measuring device according to a first embodiment.

More detailed configuration examples of the emitter 100, the mechanism optical mechanism system 200, and the measurement circuit 300 of the distance measuring device 5 according to the embodiment are explained with reference to FIG. 2. FIG. 2 is a diagram showing a configuration example of the distance measuring device 5 according to the first embodiment. As shown in FIG. 2, the distance measuring device 5 includes the emitter 100, the optical mechanism system 200, the measurement circuit 300, and the measurement information processing device 400. Among scattered lights L3, scattered light in a predetermined direction is referred to as reflected light L2. A block diagram of FIG. 2 shows an example of signals. Order of the signals and wiring for the signals are not limited to the example.

The emitter 100 includes a light source 11, an oscillator 11a, a first driving circuit 11b, a control circuit 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 incudes a second optical element 14 and the mirror 15. That is, the irradiation optical system 202 and the light-receiving optical system 204 share the mirror 15.

The measurement circuit 300 includes a photodetector 17, a sensor 18, a lens 18a, a first amplifier 19, a signal generation circuit 20, a storage circuit 21, a signal processing circuit 22, and a signal output circuit (an output interface) 23. The signal processing circuit 22 according to this embodiment corresponds to a signal processing device.

Note that, as an existing method of scanning light, the mirror 15 is used in this embodiment. However, there is a method of rotating the distance measuring device 5 (hereinafter referred to as rotating method) besides using the mirror 15. As another existing method of scanning light, there is an OPA method (Optical Phased array). Since this embodiment does not depend on the method of scanning light, light may be scanned by the rotating method or the OPA method. The signal processing circuit 22 according to this embodiment corresponds to a speed measuring device.

The oscillator 11a of the emitter 100 generates a pulse signal on the basis of control by the control circuit 16. The first driving circuit 11b drives the light source 11 on the basis of the pulse signal generated by the oscillator 11a. The light source 11 is a laser light source such as a laser diode. The light source 11 intermittently emits the laser light L1 according to driving by the first driving circuit 11b.

Figure 3:
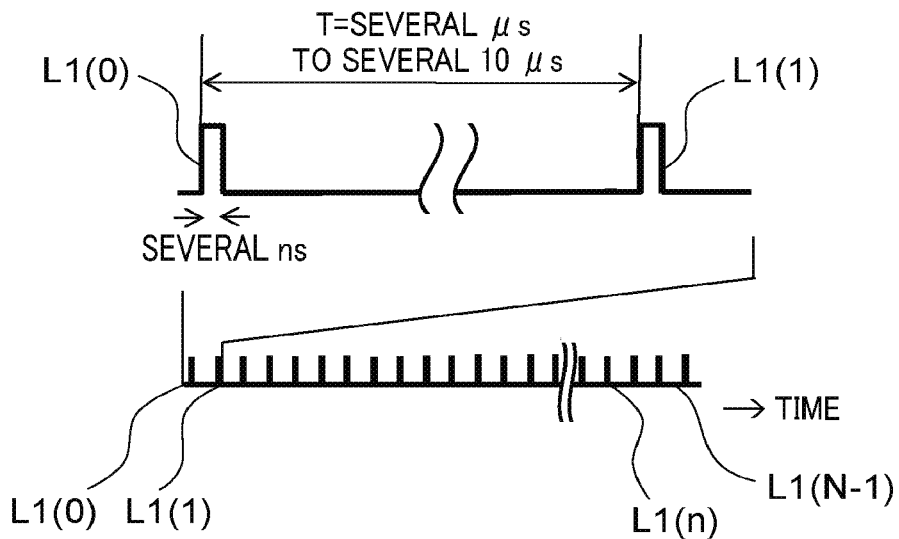
FIG. 3 depicts a diagram schematically showing an emission pattern of a light source in one frame.

An emission pattern of the light source 11 in one frame is explained with reference to FIG. 3. The frame means a combination of cyclically repeated emission of the laser light L1. FIG. 3 is a diagram schematically showing an emission pattern of the light source 11 in one frame. In FIG. 3, the horizontal axis indicates time and the vertical axis indicates emission timing of the light source 11. A figure on the upper side is an enlarged part view in a figure on the lower side. As shown in FIG. 3, the light source 11 intermittently repeatedly emits laser light $L1(n)$ ($0 \le n < N$), for example, at an interval of T=several microseconds to several ten microseconds. The laser light L1 emitted n-th is represented as $L1(n)$. "N" indicates the number of times of irradiation of the laser light $L1(n)$ irradiated to measure the measurement target object 10 in one frame. When the irradiation for one frame ends, irradiation for the next frame is started from $L1(0)$.

As shown in FIG. 2, the light source 11, the lens 12, the first optical element 13, the second optical element 14, and the mirror 15 are disposed in this order on an optical axis O1 of the irradiation optical system 202. Consequently, the lens 12 collimates the intermittently emitted laser light L1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror or a perforated mirror.

The mirror 15 includes a reflection surface 15a that reflects the laser light L1 intermittently emitted from the light source 11. The reflection surface 15a is capable of rotating around, for example, two rotation axes RA1 and RA2 crossing each other. Consequently, the mirror 15 cyclically changes an irradiation direction of the laser light L1.

The control circuit 16 includes, for example, a CPU (Central Processing Unit). The control circuit 16 performs, on the second driving circuit 16a, control for continuously changing an inclination angle of the reflection surface 15a. The second driving circuit 16a drives the mirror 15 according to a control signal supplied from the control circuit 16. That is, the control circuit 16 controls the second driving circuit 16a to change the irradiation direction of the laser light L1. Changing an irradiation direction or the like of light is called scanning.

An irradiation direction of the laser light L1 in one frame is explained with reference to FIG. 4.

Figure 4:
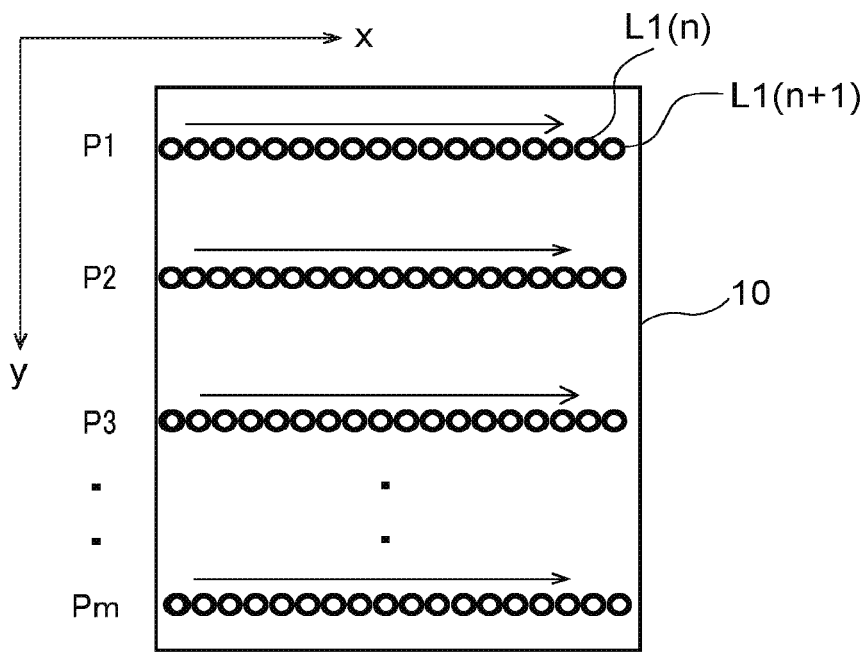
FIG. 4 depicts a schematic diagram enlarging and showing irradiation positions of laser lights on a measurement target in one frame.

As shown in FIG. 4, the reflection surface 15a changes the irradiation direction for each laser light L1 and discretely irradiates the laser light L1 along a substantially parallel plurality of linear paths P1 to Pm (m is a natural number equal to or larger than 2) on the measurement target object 10. In this way, the distance measuring device 5 according to this embodiment irradiates the laser light $L1(n)$ ($0 \le n < N$) toward the measurement target object 10 once at a time while changing an irradiation direction $O(n)$ ($0 \le n < N$) of the laser light $L1(n)$ for each frame $f(m)$ ($0 \le m < M$). The irradiation direction of the laser light $L1(n)$ is represented as $O(n)$. That is, in the distance measuring device 5 according to this embodiment, the laser light $L1(n)$ is irradiated once in the irradiation direction $O(n)$. Since the irradiation direction $O(n)$ ($0 \le n < N$) is the same in respective frames, the irradiation direction $O(n)$ ($0 \le n < N$) of an m-th frame and irradiation direction $O(n)$ ($0 \le n < N$) of an m−1-th frame coincide. As means for realizing scanning shown in FIG. 4, there is, for example, a Galvano mirror.

An irradiation example of the laser light L1 different from the irradiation of the laser light L1 shown in FIG. 4 is explained with reference to FIGS. 5 to 7.

Figure 5:
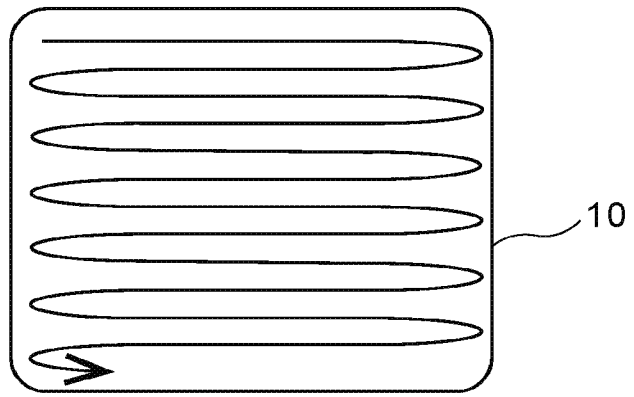
FIG. 5 depicts a schematic diagram enlarging and showing irradiation positions on the measurement target in irradiation order different from irradiation order in FIG. 4.
Figure 6:
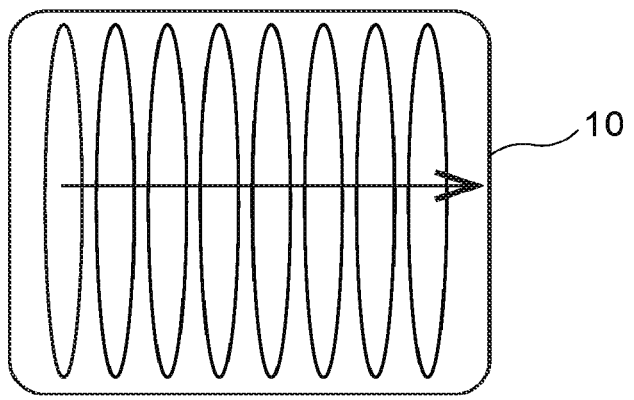
FIG. 6 depicts a diagram showing an example in which a vertical one row is simultaneously irradiated using a one-dimensional laser light source.
Figure 7A:
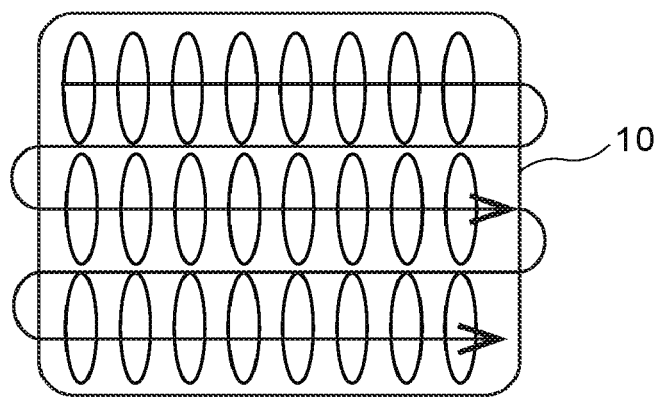
FIG. 7A depicts a diagram showing an example in which the vertical one row is simultaneously irradiated for each horizontal row using the one-dimensional laser light source.

FIG. 5 is a diagram enlarging and showing irradiation positions on the measurement target object 10 having irradiation order different from irradiation order shown in FIG. 4. In this case, first, light is scanned in the right direction in FIG. 5, thereafter turned around and scanned in the left direction, and further scanned in the right direction. In this way, the scanning is repeated. As means for realizing the scanning shown in FIG. 5, there is, for example, a two-axis MEMS (Micro Electro Mechanical System). FIG. 6 is a diagram showing an example in which a plurality of pixels are simultaneously irradiated in a longitudinal row using a laser light source including an irradiation surface having an elongated shape in a longitudinal direction and/or an aspherical collimator lens having anisotropy. As means for performing the scanning shown in FIG. 6, there is a rotary mirror and a one-axis MEMS. It is also possible to use a rotating method of directly rotating the distance measuring device 5 without using the mirror 15. In this case, the second optical element 14 is not used either. FIG. 7A is a diagram showing an example in which the plurality of pixels are simultaneously irradiated repeatedly a plurality of time in the longitudinal row using the laser light source including the irradiation surface having the elongated shape in the longitudinal direction and/or the aspherical collimator lens having anisotropy while changing a direction in the vertical direction.

Figure 7B:
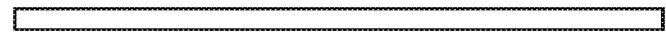
FIG. 7B depicts a diagram showing an example of laser light having an elongated shape in the longitudinal direction irradiated on an irradiation surface of the polygon mirror.
Figure 7C:
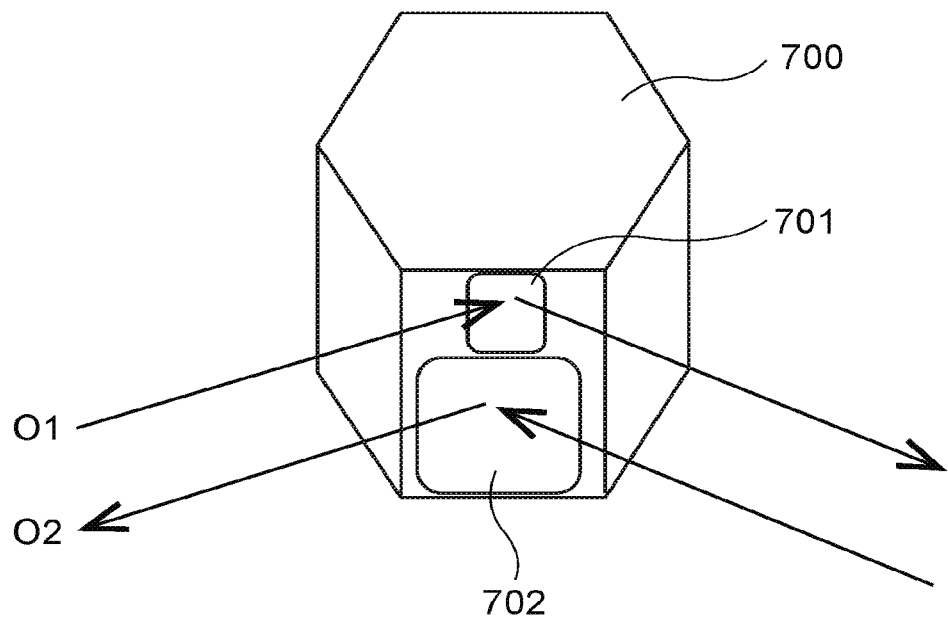
FIG. 7C depicts a diagram showing an example of a polygon mirror.

As means for performing the scanning shown in FIG. 7A, there is, for example, a polygon mirror having different tilt angles shown in FIGS. 7B and 7C. FIG. 7B is a diagram showing an example of laser light having an elongated shape in the longitudinal direction irradiated on an irradiation surface 701 (FIG. 7C) of the polygon mirror. FIG. 7C is a diagram showing, for example, an example of a polygon mirror 700 disposed in the position of the mirror 15 (FIG. 2). The projected the lase light hits O1, and the light returned from the object hits O2. The irradiation surface 701 shown in FIG. 7C have different tilt angels for each of surfaces. Consequently, when the polygon mirror 700 rotates, an irradiation direction of irradiated laser light changes in the vertical direction.

As another means for performing the scanning shown in FIG. 7A, there are a rotary mirror and a two-axis MEMS. The scanning methods explained above are mechanical methods. However, as another existing method for performing scanning, there is an OPA method (Optical Phased array). Since this embodiment does not rely on a method of scanning light, the light may be scanned by either the mechanical methods or the OPA methods.

In this way, the laser light L1(*n*) according to this embodiment is sequentially irradiated on one point at a time as shown in FIGS. 4 and 5. However, the laser light L1(*n*) is not limited to this and may be simultaneously irradiated on a plurality of points. For example, a vertical one row may be simultaneously irradiated using a one-dimensional laser light source as shown in FIG. 6 or FIG. 7A. To simplify explanation, the measurement target object 10 is schematically illustrated in a flat shape in FIG. 8. However, in actual measurement, the measurement target object 10 is, for example, an automobile.

An example in which the measurement target 10 and another reflection object are present around the irradiation range of the laser light L1(*n*) in one frame is explained with reference to FIG. 8.

Figure 8:
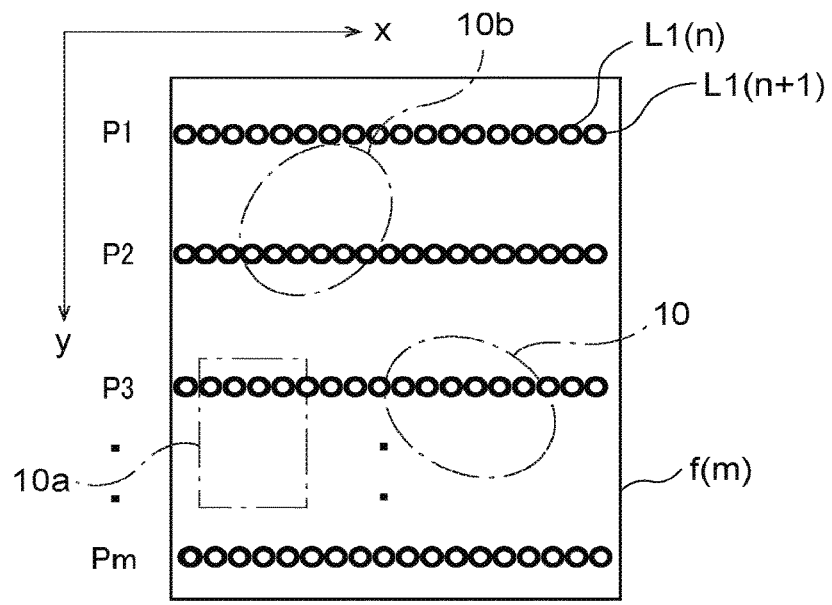
FIG. 8 depicts a diagram showing an example in which a measurement target is present in a partial region in an irradiation range.

FIG. 8 is a diagram showing an example in which the measurement target object 10 is present in a partial region of an irradiation range. As shown in FIG. 8, the measurement target object 10 is present in a partial region of an irradiation range of the laser light L1. For example, a building 10a, another automobile 10b, a person, a road, and the sky are present outside the range of the measurement target object 10. Therefore, a position where a reflection target object including the measurement target object 10 is different for each irradiation direction O(n) (0≤n<N) of the laser light L1(*n*) (0≤n<N). Therefore, a measured distance is different for each frame f(m) (0≤m<M).

As shown in FIG. 2, on an optical axis O2 of the light receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 that passes the center position of the lens 12. The optical axis O2 is a focal axis of the lens 18a that passes the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurement circuit 300 along the optical axis O2. The lens 18a condenses the reflected light L2 made incident along the optical axis O2 to the sensor 18.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is absorbed by a black body in a housing in which the light-receiving optical system 204 is disposed or is made incident on a position deviating from an incident surface of the sensor 18. On the other hand, among ambient lights such as sunlight scattered by some object, there are lights traveling along the optical axis O2. These lights are made incident on the incident surface of the sensor 18 at random and become random noise.

Note that, in FIG. 2, optical paths of the laser light L1 and the reflected light L2 are separately shown for clarification. However, actually, the laser light L1 and the reflected light L2 overlap. An optical path in the center of a light beam of the laser light L1 is shown as the optical axis O1. Similarly, an optical path of the center of a light beam of the reflected light L2 is shown as the optical axis O2.

The sensor 18 is configured by, for example, a photomultiplier (SiPM: Silicon Photomultiplier, when made of silicon). The photomultiplier is a photon counting device obtained by integrating a plurality of single-photon avalanche diodes (SPADs). The photomultiplier is capable of detecting feeble light in a photon counting level.

More specifically, the sensor 18 converts the reflected light L2 received via the light-receiving optical system 204 into an electric signal. A light receiving element 180 of the sensor 18 is formed by connecting, in parallel, a plurality of SPADs including avalanche photodiodes (APDs) 180a in a Geiger mode and quench resistors 180b.

The avalanche photodiode 180a is a light receiving element, light reception sensitivity of which is increased using a phenomenon called avalanche multiplication. The avalanche photodiode 180a used in the Geiger mode is generally used together with a quench element (explained below) and called single photon avalanche photodiode (SPAD). The avalanche photodiode 180a made of silicon has sensitivity to, for example, light having a wavelength of 200 nm to 1000 nm.

The sensor 18 according to this embodiment is configured by a silicon photomultiplier but is not limited to this. For example, the sensor 18 may be configured by disposing a plurality of photodiodes, avalanche breakdown diodes (ABDs), photomultipliers made of a compound semiconductor, or the like. The photodiode is configured by, for example, a semiconductor functioning as a photodetector. The avalanche breakdown diode is a diode, light reception sensitivity of which is increased by causing avalanche breakdown at a specific reverse voltage.

As shown in FIG. 2, the first distance measurement circuit 300a measures the distance to the measurement target 10 on the basis of a time-series luminance signal B obtained by analog-digital converting a measurement signal obtained by converting the reflected light L2 of the laser light L1 into a signal. The first distance measurement circuit 300a includes the signal generation circuit 20, the storage circuit 21, the signal processing circuit 22, and the output interface 23.

The signal generation circuit 20 converts an electric signal output by the sensor 18 into a time-series luminance signal at a predetermined sampling interval. The signal generation circuit 20 includes an amplifier 20a and an AD converter 20b. The amplifier 20a amplifies, for example, an electric signal based on the reflected light L2. More specifically, as the amplifier 20a, for example, a transimpedance amplifier (TIA) that converts a current signal of the sensor 18 into a voltage signal and amplifies the voltage signal is used. In this way, a signal obtained by sampling the electric signal based on the reflected light L2 at the predetermined sampling interval is referred to as time-series luminance signal. That is, the time-series luminance signal is a series of values obtained by sampling a temporal change of the reflected light L2 at the predetermined sampling interval.

The AD converter 20b (ADC: Analog to Digital Converter) samples, at a plurality of sampling timings, the electric signal amplified by the amplifier 20a and converts the electric signal into a first time-series luminance signal corresponding to an irradiation direction of the laser light L1. That is, the AD converter 20b samples an electric signal shown in FIG. 10 amplified by the amplifier 20a. In this case, the first time-series luminance signal generated by the signal generation circuit 20 becomes asymmetrical.

Figure 9:
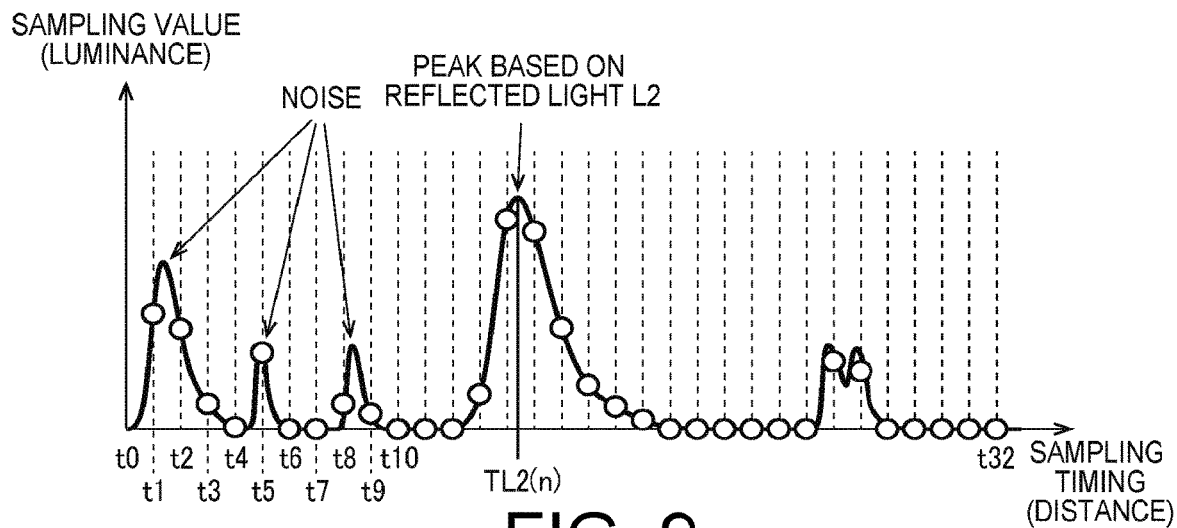
FIG. 9 depicts a diagram showing an example of a time-series luminance signal of a present frame.

An example of a time-series luminance signal B(m) of a present frame f(m) is explained with reference to FIG. 9. FIG. 9 is a diagram showing an example of the time-series luminance signal B(m) of the present frame f(m). That is, FIG. 9 is a diagram showing an example of a sampling value of an electric signal by the signal generation circuit 20 (FIG. 2). The horizontal axis of FIG. 9 indicates sampling timing and the vertical axis of FIG. 9 indicates a sampling value, that is, a luminance value of the time-series luminance signal B(m).

For example, sampling timings obtained by adding a blanking time to sampling timings t0 to t32 correspond to an elapsed time "T" (FIG. 3) from when the laser light L1($n$) is irradiated until the next laser light L1($n$+1) is irradiated. A peak in the figure is a sampling value based on the reflected light L2. Sampling timing TL2 indicating the peak corresponds to a double of the distance to the measurement target object 10. The peak means, for example, a representative value in a range in which secondary differential of a time-series luminance signal is positive. Accordingly, the peak is not always limited to a maximum of a luminance value.

More specifically, the distance is calculated by the following expression: distance=light speed×(sampling timing TL2−timing when the photodetector 17 detects the laser light L1)/2. The sampling timing is an elapsed time from light emission start time of the laser light L1.

Here, m (0≤m<M) of the time-series luminance signal B(m, x, y) indicates a number of a frame f and a coordinate (x, y) indicates a coordinate decided on the basis of an irradiation direction of the laser light L1($n$) (0≤$n$<N). That is, the coordinate (x, y) corresponds to a coordinate at the time when a distance image and a speed image of the present frame f(m) are generated. More specifically, as shown in FIG. 8, a coordinate (0, 0) corresponding to L1(0) is set as an origin and the number of irradiations of L1($n$) (0≤$n$<N) in the horizontal direction is represented as HN. A function [μ] is a function indicating a maximum integer equal to or smaller than β. In this case, x=n−[n÷HN]×HN and y=[n÷HN]. This example corresponds to the irradiation example shown in FIG. 4 but may be the irradiation examples shown in FIGS. 5, 6, and 7. In that case, relational expressions of x and y and n are different from the relational expressions described above. Note that the number of sampling timings and a time range in which sampling is performed shown in FIGS. 8 and 9 are examples. The number of sampling timings and the time range in which the sampling is performed may be changed. As the luminance signal B(m, x, y), luminance signals in adjacent coordinates may be integrated and used. For example, luminance signals in coordinate ranges of 2×2, 3×3, and 5×5 may be integrated and used. Processing for integrating the luminance signals in the coordinate ranges of 2×2, 3×3, and 5×5 is sometimes called averaging. The integration is a technique for adding time-series luminance information of a coordinate (for example, a coordinate (x+1, y+1)) near or adjacent to the coordinate (x, y) to time-series luminance information of the coordinate (x, y) to calculate final time-series luminance information to thereby improve an S/N. That is, the final time-series luminance information can include the time-series luminance information of the near or adjacent coordinate. Further, for simplification, the coordinate (x, y) of the time-series luminance signal B(m, x, y) and the coordinate (x, y) of the time-series luminance signal B(m−1, x, y) according to this embodiment are explained as being the same. However, the former coordinate may be a coordinate near or adjacent to the coordinate (x, y).

As shown in FIG. 2, the storage circuit 21 is realized by, for example, a register in a logic circuit, a semiconductor memory element such as an SRAM, a DRAM (Dynamic Random Access Memory), and a flash memory, a hard disk, or an optical disk.

The storage circuit 21 includes an output buffer circuit 21a and an integral memory past frame result storage circuit 21b. The output buffer circuit 21a is a buffer of the signal output circuit 23. The integral memory past frame result storage circuit 21b stores a processing result of the signal processing circuit 22. The integral memory past frame result storage circuit 21b stores, for example, a distance measurement result (including luminance and a reliability degree).

The signal processing circuit 22 is configured by, for example, a logic circuit including an MPU (Micro Processing Unit). The signal processing circuit 22 measures a distance on the basis of a time difference between timing when the photodetector 17 detects the laser light L1 and timing when the sensor 18 detects the reflected light L2. Details of the signal processing circuit 22 are explained below.

The output interface 23 is connected to the components in the first distance measurement circuit 300a. The output interface 23 outputs a signal to an external circuit device such as the measurement information processing device 400.

Figure 10:
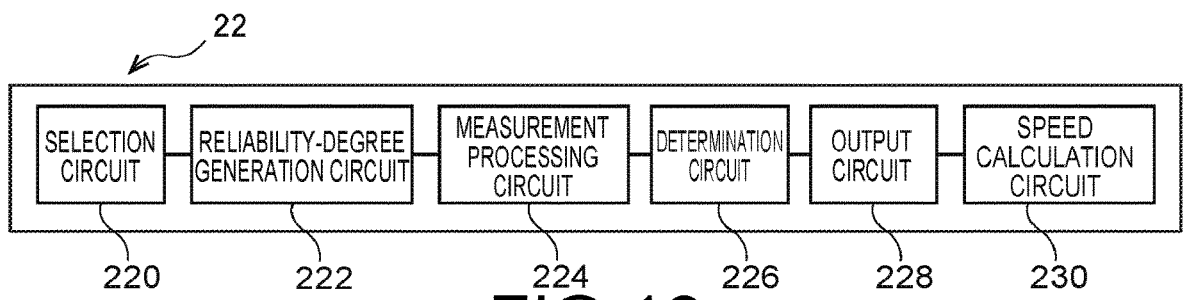
FIG. 10 depicts a block diagram showing the configuration of a signal processing circuit.

A detailed configuration of the signal processing circuit 22 is explained with reference to FIG. 10. FIG. 10 is a block diagram showing the configuration of the signal processing circuit 22. As shown in FIG. 10, the signal processing circuit 22 is a processing circuit that generates, for each time-series luminance signal B(m, x, y) (0≤x<HN, 0≤y<VN), a distance value corresponding to the time-series luminance signal B(m, x, y). The signal processing circuit 22 includes a selection circuit 220, a reliability-degree generation circuit 222, a measurement processing circuit 224, a determination circuit 226, an output circuit 228, and a speed calculation circuit 230. Each of the selection circuit 220, the reliability-degree generation circuit 222, the measurement processing circuit 224, the determination circuit 226, the output circuit 228, and the speed calculation circuit 230 is configured by a circuit. Note that the signal processing circuit 22 according to this embodiment corresponds to the speed measuring device. As explained above, HN represents the number of irradiations of L1($n$) (0≤$n$<N) in the horizontal direction and VN represents the number of irradiations of L1($n$) (0≤$n$<N) in the vertical direction. The time-series luminance signal B(m−1, x, y) corresponds to the first time-series luminance signal and the time-series luminance signal B(m, x, y) corresponds to the second time-series luminance signal. Note that the block diagram of FIG. 10 shows an example of signals. Order of the signals and wiring for the signals are not limited to the example.

The selection circuit 220 selects one or a plurality of peaks p of time-series luminance signals B(m, x, y) (0≤x<HN, 0≤y<VN) in the present frame f(m) using information concerning a distance value Dis(m−1, x, y) (0≤x<HN, 0≤y<VN) obtained on the basis of a time-series luminance signal B(m−1, x, y) (0≤x<HN, 0≤y<VN) of a preceding frame f(m−1). The distance value Dis(m−1, x, y) (0≤x<HN, 0≤y<VN) is stored in the storage circuit 21 and acquired from the storage circuit 21 by the selection circuit 220. Note that details of the selection circuit 220 are explained below. In the following explanation, to simplify description, description of ranges such as coordinates is sometimes omitted. For example, the time-series luminance signal B(m, x, y) (0≤x<HN, 0≤y<VN) is sometimes simply described as B, B(m), and B(m, x, y). Similarly, Dis(m−1, x, y) (0≤x<HN, 0≤y<VN) is sometimes simply described as Dis, Dis(m), and Dis(m, x, y). Note that Dis(m−1, x, y) (0≤x<HN, 0≤y<VN) according to this embodiment corresponds to the first distance value and Dis(m, x, y) 0≤x<HN, 0≤y<VN) according to this embodiment corresponds to the second distance value.

The reliability-degree generation circuit 222 generates a reliability degree corresponding to the peak values selected for each time-series luminance signal B(m). A peak value having a higher reliability degree indicates that the peak value is more likely. Details of the reliability-degree generation circuit 222 are also explained below.

The measurement processing circuit 224 generates a distance value Dis(m) corresponding to each time-series luminance signal B(m) in the present frame f(m) on the basis of the reliability degrees corresponding to the peak values selected for each time-series luminance signal B(m). More specifically, the measurement processing circuit 224 generates the distance value Dis(m) corresponding to a peak indicating a maximum value among the reliability degrees corresponding to the peak values selected for each time-series luminance signal B(m). The distance value Dis(m) is stored in the storage circuit 21.

The determination circuit 226 determines, on the basis of correlation between a first time-series luminance signal B(m−1, x, y) based on reflected light of a first measurement target and a second time-series luminance signal B(m, x, y) based on reflected light of a second measurement target, whether the first measurement target and the second measurement target are the same measurement target. That is, the determination circuit 226 determines, on the basis of the correlation between the first time-series luminance signal B(m−1, x, y) and the second time-series luminance signal B(m, x, y), whether the time-series luminance signal B(m) and a time-series luminance signal B(m−1) corresponding to the time-series luminance signal B(m) are time-series luminance signals based on reflected light reflected from the same measurement target. For example, the determination circuit 226 determines, on the basis of a distance value Dis(m−1) and a distance value Dis(m), about the time series luminance signals B(m), whether the time-series luminance signal B(m) and the time-series luminance signal B(m−1) corresponding to the time-series luminance signal B(m) are the time-series luminance signals based on the reflected light reflected from the same measurement target. The corresponding time-series luminance signals mean, for example, the time-series luminance signal B(m−1, x, y) and the time-series luminance signal B(m, x, y) of the same coordinate (x, y). For example, the corresponding time-series luminance signals mean the time-series luminance signals B(m−1, x, y) and B(m, x, y) in which an irradiation direction O of the laser light L1 is the same.

The determination circuit 226 determines, on the basis of correlation between a predetermined peak of the time-series luminance signal B(m−1, x, y) and a predetermined peak of the time-series luminance signal B(m, x, y), whether the time-series luminance signal B(m−1, x, y) and the time-series luminance signal B(m, x, y) corresponding to the time-series luminance signal B(m−1, x, y) are time-series luminance signals based on reflected light reflected from the same measurement target.

Further, the determination circuit 226 determines, on the basis of correlation between a value concerning ambient light of the time-series luminance signal B(m−1, x, y) and a value concerning ambient light of the time-series luminance signal B(m, x, y), whether the time-series luminance signal B(m−1, x, y) and the time-series luminance signal B(m, x, y) corresponding to the time-series luminance signal B(m−1, x, y) are time-series luminance signals based on reflected light reflected from the same measurement target. The information concerning the peak and the value concerning the ambient light of the time-series luminance signal B(m−1, x, y) (0≤x<H, 0≤y<VN) and the information concerning the peak and the value concerning the ambient light of the time-series luminance signal B(m, x, y) (0≤x<HN, 0≤y<VN) are stored in the storage circuit 21. A specific method of performing determination based on correlation and details of the determination circuit 226 are also explained below.

The output circuit 228 gives, concerning coordinates determined by the determination circuit 226 as being the same measurement target, unique Id(m, x, y) (0≤x<HN, 0≤y<VN) as discrimination information. The output circuit 228 gives, concerning coordinates determined by the determination circuit 226 as not being the same measurement target, Id(m, x, y) (0≤x<HN, 0≤y<VN)=0 as discrimination information. For example, the output circuit 228 retains only a distance value of one peak, a luminance value, and the magnitude of ambient light as information concerning the preceding frame f(m−1) and the specific coordinate (x, y). This case is referred to as memory saving mode. In the memory saving mode, 1 is retained as the discrimination information for the same measurement discrimination information. The discrimination information may be 1 bit. Other information to be retained is little. Therefore, memory consumption can be saved. The output circuit 228 outputs discrimination information Id to the measurement information processing device 400. The speed calculation circuit 230 can also be disposed in the measurement information processing device 400.

The output circuit 228 outputs the distance value Dis(m, x, y) (0≤x<HN, 0≤y<VN) and the relative speed V(m, x, y) (0≤x<HN, 0≤y<VN) calculated by the speed calculation circuit 230 to the measurement information processing device 400. Consequently, the measurement information processing device 400 is capable of generating a distance image of the distance value Dis(m, x, y) 0≤x<HN, 0≤y<VN) and a speed image of the relative speed V(m, x, y) (0≤x<HN, 0≤y<VN).

The speed calculation circuit 230 calculates, concerning the coordinate (x, y), discrimination information of which is Id(m, x, y)=1, relative speed in the depth direction of the measurement target 10, that is, an optical axis L1 direction on the basis of a difference value between the distance value Dis(m−1, x, y) and the distance value Dis(m, x, y) and a time difference Δt between irradiation timing of the laser light L1 corresponding to the time-series luminance signal B(m−1) and irradiation timing of the laser light L1 corresponding to the time-series luminance signal B(m). More specifically, the speed calculation circuit 230 calculates the relative speed V(m, x, y) (0≤x<HN, 0≤y<VN) by dividing the difference value between the distance value Dis(m−1, x, y) (0≤x<HN, 0≤y<VN) and the distance value Dis(m, x, y) (0≤x<HN, 0≤y<VN) by time difference Δt. The relative speed V(m, x, y) (0≤x<HN, 0≤y<VN) is stored in the storage circuit 21. The time difference Δt according to this embodiment is decided by a frame cycle. For example, in the case of 20 fps, the time difference Δt is 50 milliseconds. As explained above, the speed calculation circuit 230 is also capable of calculating speed by subtracting the speed of the distance measuring device 5 from the relative speed V(m, x, y).

A method of selecting second selection peaks of the time-series luminance signal B(m, x, y) in the present frame f(m) using an adjacent distance NDis in the preceding frame f(m−1) is explained with reference to FIGS. 11 to 14. A predetermined number of peaks selected in descending order of values of peaks out of peaks of the time-series luminance signal B(m, x, y) are referred to as first selection peaks. Peaks selected using the adjacent distance NDis of the preceding frame f(m−1) besides the first selection peaks are referred to as second selection peaks.

First, an example in which a peak based on the measurement target 10 cannot be selected only with the first selection peaks is explained with reference to FIG. 11.

Figure 11:
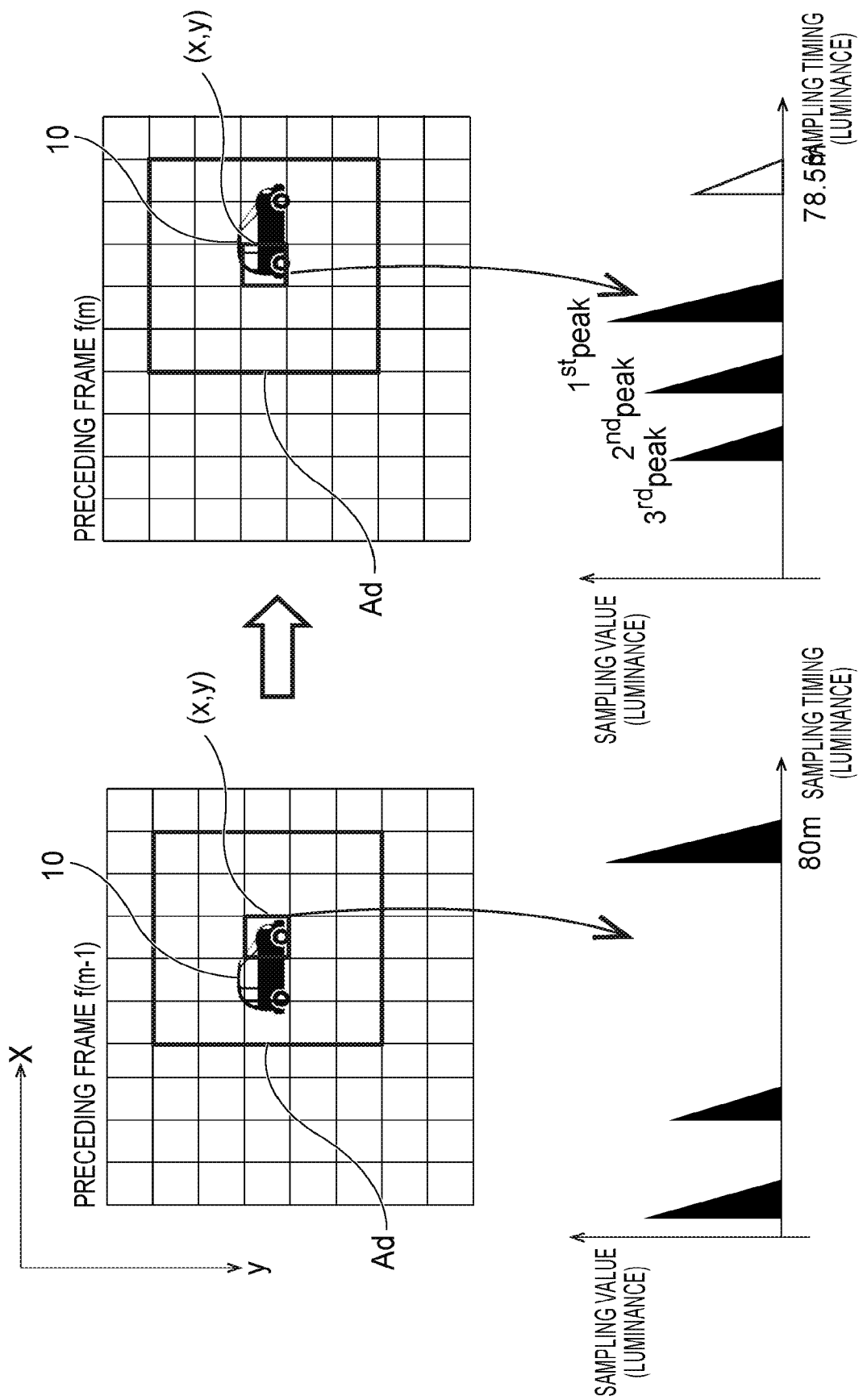
FIG. 11 depicts a diagram schematically showing an adjacent region and a time-series luminance signal.

FIG. 11 is a diagram schematically showing examples of an adjacent region Ad and the time-series luminance signal B(m−1, x, y) in the coordinate (x, y) in the preceding frame f(m−1) and the adjacent region Ad and the time-series luminance signal B(m, x, y) in the coordinate (x, y) in the present frame f(m). An upper left figure shows the adjacent region Ad in the coordinate (x, y) in the preceding frame f(m−1). A lower left figure shows the time-series luminance signal B(m−1, x, y) in the coordinate (x, y). An upper right figure shows the adjacent region Ad in the coordinate (x, y) in the present frame f(m). A lower right figure shows the time-series luminance signal B(m, x, y) in the coordinate (x, y) in the present frame f(m). A center coordinate (x, y) of the adjacent region Ad is indicated by a thick line. The measurement target object 10 is, for example, an automobile. The measurement target object 10 is moving from the left to the right along an x axis 80 meters ahead on the optical axis O1 of the irradiation optical system 202 in the distance measuring device 5 (FIG. 2). The adjacent region Ad indicates a range corresponding to laser light L1(n) (n=HN× (Y−1)+X, x−nd≤X≤x+nd, y−nd≤Y≤y+nd) irradiated in a direction within a predetermined range from an irradiation direction of laser light L1(n) (n=HN×(y−1)+x) corresponding to the time-series luminance signal B(m, x, y); where nd=2. That is, the adjacent region Ad is a coordinate range of (2*nd+1)×(2*nd+1) centering on the coordinate (x, y).

As shown in FIG. 11, in the time-series luminance signal B(n−1, x, y) of the preceding frame f(m−1), a peak corresponding to a position of 80 meters of the measurement target object 10 appears. On the other hand, in the example of the time-series luminance signal B(m, x, y) of the present frame f(m), noise light predominantly appears as first to third peaks and a peak corresponding to the position of 80 meters of the measurement target object 10 appears as a fourth peak. The fourth peak corresponding to the position 78.5 meters of the measurement target 10 is not included in the first to third peaks, that is, the first selection peaks, the predetermined number of which is 3. In such a case, the position 78.5 meters of the measurement target 10 cannot be obtained by a general measuring method for measuring the first peak as a distance value.

The adjacent distance NDis obtained in the adjacent region Ad of the coordinate (x, y) in the preceding frame f(m−1) is explained with reference to FIG. 12.

Figure 12:
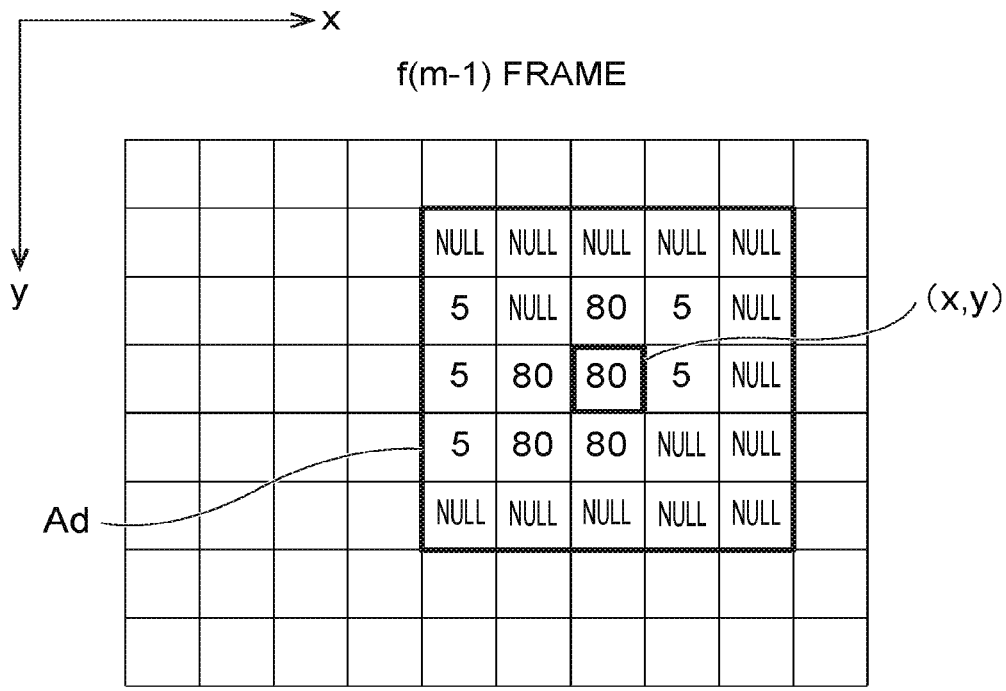
FIG. 12 depicts a diagram showing an adjacent distance obtained in the adjacent region on the basis of the time-series luminance signal.

FIG. 12 is a diagram corresponding to the upper left figure of FIG. 11 and is a diagram showing an adjacent distance NDis(m−1, X, Y) (x−nd≤X≤x+nd, y−nd≤Y≤y+nd) obtained in the adjacent region Ad on the basis of the time-series luminance signal B(m−1, X, Y) (x−nd≤X≤x+nd, y−nd≤Y≤y+nd) in the preceding frame f(m−1). A center coordinate (x, y) of the adjacent region Ad is indicated by a thick line. For example, the adjacent distance NDis(m−1, X, Y) (x−nd≤X≤x+nd, y−nd≤Y≤y+nd) indicates 5 meters, 80 meters, and NULL. 5 meters indicates a distance to an object other than the measurement target object 10. 80 meters indicates a distance to the measurement target object 10. NULL is, for example, a space region, a road, or the like on the background and indicates that a reliability degree is low and a measurement value is discarded.

A method of selecting the second selection peaks of the time-series luminance signal B(m, x, y) in the present frame f(m) using the adjacent distance NDis obtained in the adjacent region Ad of the coordinate (x, y) in the preceding frame f(m−1) is explained with reference to FIG. 13.

Figure 13:
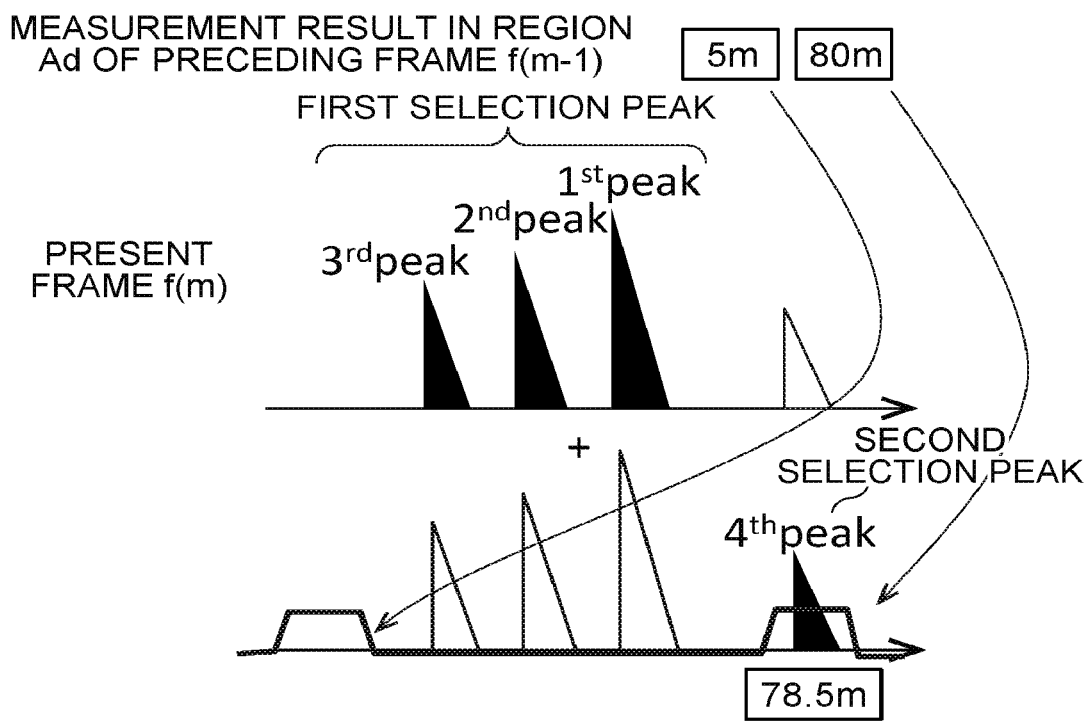
FIG. 13 depicts a diagram showing an example of selection processing of a selection circuit.

FIG. 13 is a diagram showing an example of selection processing of the selection circuit 220. As shown in FIG. 13, for example, 5 meters and 80 meters indicate the adjacent distance NDis(m−1, X, Y) (x−nd≤X≤x+nd, y−≤Y≤y+nd) obtained in the adjacent region Ad (FIG. 12) in the coordinate (x, y). Note that, if the frame cycle is 20 fps, an irradiation interval of the laser light L1 is 50 ms. Consequently, the relative speed of the automobile shown in FIG. 12 is calculated as (80 m−78.5 m)/50 ms=108 Km/h.

The selection circuit 220 selects a predetermined number of first selection peaks (first to third peaks) of the time-series luminance signal B(m, x, y) in the present frame f(m) in order from the largest peak and further selects a predetermined second selection peak (a fourth peak) of the time-series luminance signal B(m, x, y) in the present frame f(m) using information concerning the adjacent distance values (5 meters and 80 meters) in the preceding frame f(m−1). The predetermined number of the first selection peaks is, for example, three. For example, the selection circuit 220 selects a peak corresponding to a time range based on the adjacent distance NDis(m−1, X, Y) (x−nd≤X≤x+nd, y−nd≤Y≤y+nd) and the relative speed V(m−1, X, Y) (x−nd≤X≤x+nd, y−nd≤Y≤y+nd). Note that, since a time corresponds to a distance, the time range corresponds to a distance range.

More specifically, the selection circuit 220 multiplies the time-series luminance signal B(m, x, y) by an integration filter (window) having time-series values in which a value of a time position corresponding to the adjacent distance NDis (m−1, X, Y) (x−nd≤X≤x+nd, y−nd≤Y≤y+nd) obtained in the adjacent region Ad in the coordinate (x, y) is a coefficient K and the other ranges are, for example, 0. K is, for example, 1. For example, if one adjacent distance NDis(m−1, X, Y) (x−nd≤X≤x+nd, y−nd≤Y≤y+nd) is 80 meters, a predetermined range centering on a time obtained by dividing 80 meters by light speed and doubling a quotient is a time range corresponding to the adjacent distance of 80 meters. The time range corresponds to the width of the integral filter. A start point of the integral filter is, for example, t0 in FIG. 9. That is, a range of the integral filter corresponds to, for example, t0 to t7 or t0 to t3.

A relation between the width of the integral filter (the window) and the relative speed is explained with reference to FIG. 14. The selection circuit 220 sets the width of the integral filter according to the relative speed V(m−1, X, Y) (x−nd≤X≤x+nd, y−nd≤Y≤y+nd). For example, the selection circuit 220 reduces the range of the integral filter as the relative speed V(m−1, X, Y) (x−nd≤X≤x+nd, y−nd≤Y≤y+ nd) decreases.

Figure 14:
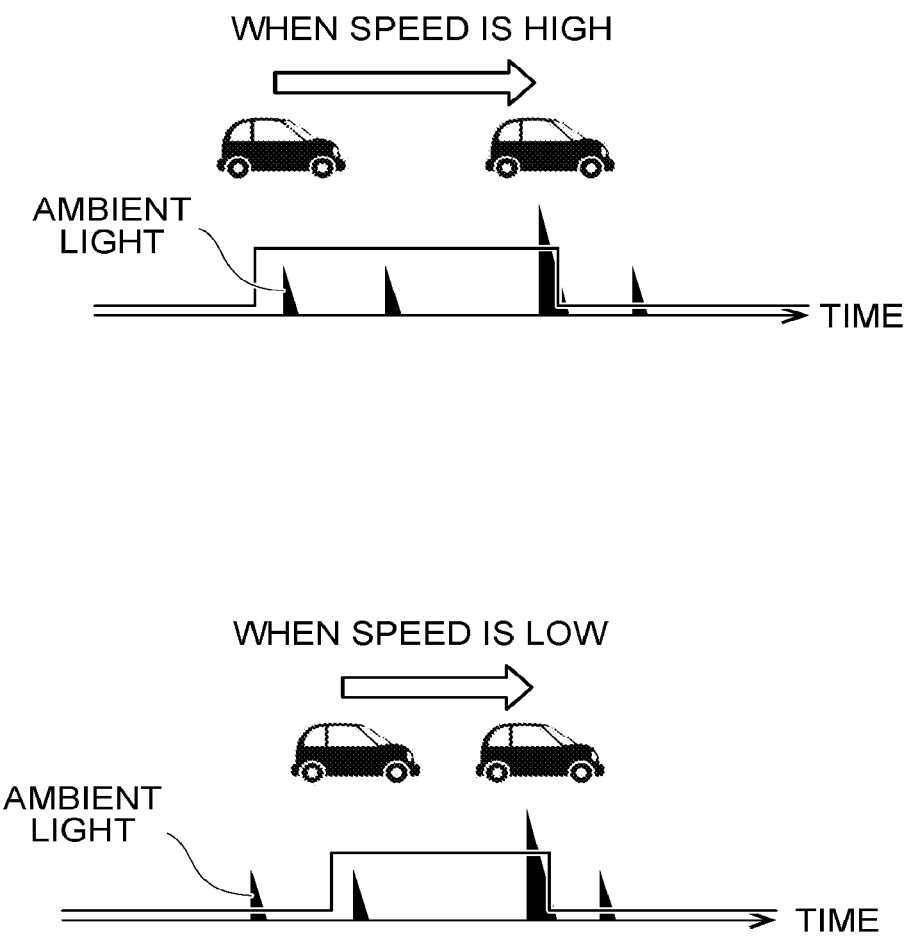
FIG. 14 depicts a diagram conceptually showing a relation between an integral filter and ambient light.

FIG. 14 is a diagram conceptually showing a relation between the integral filter and ambient light. An upper figure shows the width of the integral filter (the window) at the time when the relative speed is higher. A lower figure shows the width of the integral filter (the window) at the time when the relative speed is lower than the relative speed shown in the upper figure. The horizontal axis indicates a time from irradiation of the laser light L1. That is, the horizontal axis is converted into a distance. In this way, it is possible to further suppress the influence of ambient light noise by setting the width of the integral filter narrower as the relative speed further decreases.

The selection circuit 220 selects, as the second selection peaks, peaks obtained by the integral filter processing. The selection circuit 220 performs processing for adding the first selection peaks and the second selection peaks as predetermined selection peaks. For example, when there are five kinds of adjacent distances obtained in the adjacent region Ad (FIG. 12), ranges in which K is 1 in the integral filter (the window) are five places. The ranges in which K is 1 are ranges in which a temporal margin is given to the width based on the relative speed V(m−1, X, Y).

The selection circuit 220 sets a range of the adjacent region Ad (FIG. 12) on the basis of a range in which the measurement target 10 moves between frames. Consequently, even if the measurement target 10 moves at assumed relative speed or less, peaks corresponding to the measurement target 10 can be included in the second peaks. Note that, in the integral filter according to this embodiment, a value outside a range in which K is 1 is set to 0. However, the value is not limited to this. A numerical value such as 0.1 may be given to the value.

In this way, the selection circuit 220 selects the predetermined number of peak values in descending order as the first selection peaks for each time series luminance signal B(m, x, y) (0≤x<HN, 0≤y<VN) in the present frame f(m) and further selects the second selection peak values for each time-series luminance signal B(m, x, y) (0≤x<HN, 0≤y<VN) in the present frame f(m) using information concerning the adjacent distance value NDist(m−1, X, Y) (x−nd≤X≤x+nd, y−nd≤Y≤y+nd, 0≤x<HN, 0≤y<VN) in the preceding frame f(m−1). That is, the selection circuit 220 acquires, for each time-series luminance signal B(m, x, y) (0≤x<HN, 0≤y<VN) in the present frame f(m), the adjacent distance value NDist(m−1, X, Y) (x−nd≤X≤x+nd, y−nd≤Y≤y+nd, 0≤x<HN, 0≤y<VN) based on the laser light L1(n) (n=HN×(Y−1)+X, x−nd≤X≤x+nd, y−nd≤Y≤y+nd) of the preceding frame f(m−1) irradiated in a direction within a predetermined range from an irradiation direction of the laser light L1(n) (n=HN×(y−1)+x) corresponding to the time-series luminance signal B(m, x, y) (0≤x<HN, 0≤y<VN) and selects, for each time-series luminance signal B(m, x, y) (0≤x<HN, 0≤y<VN), the second peak values in a range corresponding to the adjacent distance value NDist(m−1, X, Y) (x−nd≤X≤x+nd, y−nd≤Y≤y+nd, 0≤x<HN, 0≤y<VN).

The selection circuit 220 is configured not to select the second selection peaks when an S/N ratio of the luminance signal B(m) exceeds a predetermined value. When the S/N ratio is good, there is hardly any effect by the selection of the second selection peaks and only disadvantages of the second selection peaks remain. For example, a threshold of denoise slightly increases. Accordingly, when the S/N ratio is good, it is possible to improve a measurement result by not selecting the second selection peaks.

As it is seen from the following explanation, it is possible to add the second selection peaks to the first selection peaks as predetermined selection peaks. For example, when noise or the like is mixed and only the first selection peaks are selected, the fourth peak and the like corresponding to the measurement target 10 are sometimes not selected. On the other hand, by selecting the second selection peaks corresponding to the adjacent distance value NDis(m−1, X, Y) (x−nd≤X≤x+nd, y−nd≤Y≤y+nd), it is possible to include, in the second selection peaks, the peaks based on the reflected light from the measurement target 10 as explained above even when the fourth peak and the like are not included in the first selection peaks. Further, since the range of the integral filter is reduced as the relative speed V(m−1, X, Y) (x−nd≤X≤x+nd, y−nd≤Y≤y+nd) decreases, it is also possible to reduce the influence of the ambient light.

In this embodiment, a time-series luminance signal (an ADC result or an integral result of the ADC result) of the preceding frame is not retained and a result of the preceding frame is not directly integrated. Only a detection result of the time-series luminance signal is retained in the storage circuit 21. Since the result of the preceding frame is not directly integrated, it is possible to reduce possibility of an increase in wrong distance measurement and a distance measurement error due to old results of the preceding frame. For example, an integral filter corresponding to 5 m in FIG. 13 where a peak of the present frame is absent does not affect a distance measurement result and does not cause wrong distance measurement. Since it is unnecessary to retain a luminance signal of a time series of the preceding frame, it is possible to suppress a storage capacity of the storage circuit 21 to less than 2 percent compared with when the luminance signal is retained. For example, implementation is possible with addition of up to 1.73 MB with respect to the conventional integration method SAT to a frame of horizontal 450 pixels and vertical 192 pixels. A data amount is 1.8% or less compared with a data amount 95 MB of the ADC result of the preceding frame (see, for example, Non-Patent Literature 1).

A detailed processing example of the reliability-degree generation circuit 222, which generates a reliability degree R1 of peaks selected by the selection circuit 220, is explained. The reliability degree R1(p, m, x, y) (0≤p<PN, 0≤x<HN, 0≤y<VN) is formed by a first reliability degree R11(p, m, x, y) (0≤p<PN, 0≤x<HN, 0≤y<VN) for which information concerning the present frame f(m) is used and a second reliability degree R12(p, m, x, y) (0≤p<PN, 0≤x<HN, 0≤y<VN) for which information concerning the preceding frame f(m−1) is also used.

[Math 1]

$$R1(p,m,x,y)=\sqrt{R11(p,m,x,y)^2+R12(p,m,x,y)^2} \qquad (1)$$

Information necessary for calculation of the first reliability degree R1 (p, m, x, y) (0≤p<PN, 0≤x<HN, 0≤y<VN) indicated by Expression (1) is stored in the storage circuit 21. That is, the storage circuit 21 has stored therein a distance value D(p, m, x, y) (1≤p≤PN, 0≤x<HN, 0≤y<VN) of a peak p of the present frame f(m) and a luminance value Lumi(p, m, x, y) (1≤p≤PN, 0≤x<HN, 0≤y<VN) corresponding to the distance value D(p, m, x, y), a distance value D(p, m−1, x, y) (p=1, 0≤x≤HN, 0≤y<VN) of a peak p of the preceding frame f(m−1) and a luminance value Lumi(p, m−1, x, y) (p=1, 0≤x<HN, 0≤y<VN) corresponding to the distance value D(p, m−1, x, y), and information NC(m, x, y) (0≤x≤N, 0≤y<VN) of ambient light of the present frame f(m) and information NC(m−1, x, y) (0≤x≤HN, 0≤y<VN) of ambient light of the preceding frame f(m−1). The information NC(m, x, y) of the ambient light is information related to a value indicating an S/N of the time-series luminance signal B(m, x, y). The ambient light is, for example, a value obtained by adding up the ambient light for a predetermined time.

In the above expression, "p" is a number of a peak selected by the selection circuit 220 and corresponds to order of sizes of peaks. For example, p=1 indicates the first peak and p=2 indicates the second peak. PN is the number of peaks selected by the selection circuit 220 and is based on a number selected according to an adjacent distance obtained in the adjacent region Ad (FIG. 12). Since p=1 in the distance value D(p, m−1, x, y) (p=1, 0≤x≤HN, 0≤y<VN), the distance value D(1, m−1, x, y) of the peak p is the same value as the distance value Dis(m−1, x, y).

The reliability degree R1(p, m, x, y) indicated by Expression (1) is, for example, a square root of an added-up value of a square of a first reliability degree R11(p, m, x, y) indicated by Expression (2) and a square of a second reliability degree R12 (p, m, x, y) indicated by Expression (3).

The first reliability degree R11(p, m, x, y) (0≤p<PN, 0≤x<HN, 0≤y<VN) is a reliability degree calculated using the distance value D(p, m, x, y) (1≤a≤PN, 0≤x<HN, 0≤y<VN) of the peak p of the present frame f(m); where nd1 and nd2 are constants indicating a range of an adjacent region of the coordinate (x, y). For example, nd1=3 and nd2=3.

[Math 2]

$$R11(p, m, x, y) = \sqrt{\sum_{n=1}^{PN} \sum_{N=x+nd1}^{x+nd1} \sum_{y=nd2}^{y+nd2} Q11\left\{\begin{array}{c} D(a, m, X, Y) - \\ D(p, m, X, Y) \end{array}\right\} \times Q21(Lumi(a, m, X, Y))^2} \quad (2)$$

[Math 2-1]

$$Q11(D1, D2): |D1 - D2| \le ks(D1) \quad (2\text{-}1)$$

[Math 2-1]

$$ks(D1) = C1 \times \sqrt{D1} \quad (2\text{-}2)$$

A function Q11(D1-D2) indicated by Expression (2-1) indicates 1 if the distance between a distance value D1 and a distance value D2 is equal to or less than a predetermined number C1 times or less of sqrt(D1) and indicates 0 if the distance is larger than the predetermined number C1. In another example, ks(D1) may be ks(D1)=max(C1×sqrt(D1), C2). Consequently, the first reliability degree R11(p, m, x, y) indicated by Expression (2) indicates a square sum of the distance value D(p, m, x, y) of the peak p and a luminance value of the peak "a" in an adjacent region having a distance value equal to or smaller than a distance c1×sqrt(D(p, m, x, y)). C1 and C2 are constants.

A function Q21(Lumi) indicated by Expression (2) outputs Lumi if Lumi is equal to or smaller than a threshold TH based on information concerning ambient light and outputs 0 if Lumi is larger than TH. That is, if Lumi is larger than TH, the function Q21(L) outputs 0, whereby it is possible to exclude, from calculation of the first reliability degree R11, a peak having an S/N larger than a predetermined value.

Information concerning an ambient light value NC1(m, x, y) (0≤x<HN, 0≤y<VN) may be stored in the storage circuit 21 for each coordinate (x, y) of the present frame f(m) and the preceding frame f(m−1). In this case, in Expression (2), a threshold TH(m, x, y) (0≤x<HN, 0≤y<VN) based on the ambient light value NC(m, x, y) (0≤x<HN, 0≤y<VN) is used for each coordinate (x, y).

As it is seen from this, a larger number of peaks "a" having equivalent distance values are present in an adjacent region with respect to the peak p. The first reliability degree R11 increases as a luminance value of the peaks "a" increases. In the peak p corresponding to the measurement target 10, since the peaks "a" having the equivalent distance values occur in the adjacent region, the first reliability degree R11(p, m, x, y) further increases. On the other hand, the peak p corresponding to noise occurs at random. Therefore, the first reliability degree R11 of the peak p corresponding to noise is smaller than the first reliability degree R11 of the peak p corresponding to the measurement target 10.

The second reliability degree R12(p, m, x, y) (1≤p≤PN, 0≤x<HN, 0≤y<VN) is a reliability degree calculated using the distance value D(p, m−1, x, y) (p=1, 0)(HN, 0≤y<VN) of the peak p of the preceding frame f(m−1). As indicated by Expression (3), the second reliability degree R12(p, m, x, y) indicates a square sum of the distance value D(p, m, x, y) of the peak p and the luminance value of the peak p in the adjacent region having the distance value equal to or smaller than a distance kp. By setting p=1, it is possible to suppress a storage amount of the storage circuit 21. That is, the distance value D(p, m−1, x, y) (p=1, 0≤x≤HN, 0≤y<VN) is Dis(m−1, x, y) (0≤x≤HN, 0≤y<VN) corresponding to the coordinate (x, y) determined in the preceding frame.

[Math 3]

$$R12(p, m, x, y) = \sqrt{\sum_{a=1}^{1} \sum_{X=x+nd1}^{x+nd1} \sum_{Y=y=nd2}^{y+nd2} Q13\left\{\begin{array}{c} D(a, m-1, X, Y) - \\ D(p, m, X, Y) \end{array}\right\} \times Q21(Lumi(a, m-1, X, Y))^2} \quad (3)$$

$$R2_{i,a} = \left[\sum_{j \in A, b \in Ss(j)} L(j, b, N)^2 \times P_s(D(i, a, N), D(j, b, N))\right]^{1/2},$$

$$P_s(D_1, D_2): |D_1 - D_2| \le k_s(D_1)$$

As in Expression (2), the function Q21(Lumi) indicated by Expression (3) outputs Lumi if Lumi is equal to or smaller than the threshold TH based on the information concerning ambient light and outputs 0 if Lumi is larger than TH. That is, if Lumi is larger than TH, the function Q21 (Lumi) outputs 0. Therefore, it is possible to exclude, from the calculation of the first reliability degree R11, a peak having an S/N larger than the predetermined value.

As indicated by Expressions (4-1) and (4-2), Q13 is a discrimination function for specifying a window. The window is determined by the distance D1 of the preceding frame and V×Δt, which is a change amount of the distance D1. V1 is relative speed corresponding to the distance D1 of the preceding frame. That is, the relative speed V(m−1, X, Y) corresponds to a distance D(a, m−1, X, Y) of the preceding frame. At is an irradiation interval of the laser light L1. Accordingly, the change amount V×Δt means a movement of the measurement target 10. The window is narrowed as the relative speed V is smaller. The influence of ambient light noise is reduced. For example, Q13 outputs 1 when the condition of Expression (4-1) is satisfied and outputs 0 otherwise.

[Math 4-1]

$$Q13(D1,D2): |D1-D2| \le kp(D1,V) \quad (4\text{-}1)$$

[Math 4-2]

$$kp(D1,V) = C1 \times \sqrt{D1} + C2 \times |V| \times \Delta t \quad (4\text{-}2)$$

As indicated by Expression (4-2), in order to allow the movement of the measurement target 10, a threshold kp is set larger than the threshold ks in Expression (2-2) because the threshold kp depends on the absolute value of the relative speed V in the traveling direction. The search window Q13 is narrowed as the relative speed V decreases. Consequently, it is possible to reduce the influence of environment noise.

As it is seen from the above, a large number of peaks "a" having distances equivalent to a distance considering relative speed of the measurement target 10 corresponding to the peak p are present in an adjacent region of the preceding frame f(m−1). The second reliability degree R12(p, m, x, y) increases as a luminance value of the peaks "a" increases. The peak p corresponding to the measurement target 10 has a distance equivalent to the distance considering the relative speed V of the measurement target 10 in the preceding frame f(m−1) as well. Accordingly, a larger number of peaks "a" having distance values equivalent to the distance considering the relative speed of the measurement target 10 occur in the adjacent region of the peak p corresponding to the measurement target 10. Consequently, the second reliability degree R12 of the peak p corresponding to the measurement target 10 is larger. On the other hand, the peak p corresponding to noise occurs at random. Therefore, the peaks "a" having the distance values equivalent to the distance considering the relative speed of the measurement target 10 in the adjacent region decease according to an occurrence probability of noise. Accordingly, the second reliability degree R12 of the peak p corresponding to noise is generally smaller than the second reliability degree R12 of the peak p corresponding to the measurement target 10.

In this way, a larger number of peaks "a" having the distances equivalent to the distance considering the relative speed of the measurement target 10 are present in the adjacent regions in the preceding frame f(m−1) and the present frame f(m). The reliability degree R1(p, m, x, y) of the peak p corresponding to the measurement target 10 further increases as the luminance value of the peaks "a" increases. On the other hand, the peak p corresponding to noise occurs at random. Therefore, the peaks "a" having the distance values equivalent to the distance considering the relative speed of the measurement target 10 decrease in the adjacent region. Accordingly, the reliability degree R1(p, m, x, y) of the peak p corresponding to noise is generally smaller than the reliability degree R1(p, m, x, y) of the peak p corresponding to the measurement target 10.

Details about "the discrimination method based on correlation" and the determination circuit 226 explained above are explained. The determination circuit 226 determines, on the basis of an evaluation value E(m, x, y) indicated by Expression (5), for each time-series luminance signal B(m, x, y), whether the time-series luminance signal B(m, x, y) and the time-series luminance signal B(m−1, x, y) corresponding to the time-series luminance signal B(m, x, y) are time-series luminance signals based on reflected light reflected from the same measurement target. The evaluation value E(m, x, y) outputs a higher value as possibility that the time-series luminance signal B(m, x, y) and the time-series luminance signal B(m−1, x, y) corresponding to the time-series luminance signal B(m, x, y) are the time-series luminance signals based on the reflected light reflected from the same measurement target increases. In this way, accuracy of a reliability degree is improved by calculating speed and the like using information concerning the reflected light reflected from the same measurement target. It is possible to further improve a measurement result (increase a distance measurement success ratio and increase distance accuracy) by combining integration techniques.

When the evaluation value E(m, x, y) is equal to or larger than a predetermined value, the determination circuit 226 determines that the time-series luminance signal B(m−1, x, y) is the time-series luminance signal based on the reflected light reflected from the same measurement target. The evaluation value E(m, x, y) is calculated on the basis of a distance evaluation value E1(m, x, y), a peak evaluation value E2(m, x, y), and an ambient light evaluation value E3(m, x, y). In Expression (5), ce1, ce2, and ce3 are constants. The determination circuit 226 is also capable of setting only any one of ce1, ce2, and ce3 to 1 and set the other constants to 0. That is, the determination circuit 226 is also capable of performing evaluation based on any one of the distance evaluation value E1(m, x, y), the peak evaluation value E2(m, x, y), and the ambient light evaluation value E3(m, x, y).

[Math 5]

$$E(m,x,y) = \frac{1}{\sqrt{ce1 \times E1(m,x,y)^2 + ce2 \times E2(m,x,y)^2 + ce3 \times E3(m,x,y)^2}} \quad (5)$$

As indicated by Expression (6), the distance evaluation value E1(m, x, y) is an evaluation value based on the distance value Dis(m−1, x, y) and the distance value Dis(m, x, y). As explained above, $\Delta t$ is the time difference between the irradiation timing t(m−1, x, y) of the laser light L1 corresponding to the time-series luminance signal B(m−1, x, y) and the irradiation timing t(m, x, y) of the laser light L1 corresponding to the time-series luminance signal B(m, x, y). For example, a function FE1(x) is a function that outputs a larger value as a value of x is smaller. The function FE1(x) is a nonlinear function that outputs a constant when the value of x is smaller than a predetermined value.

[Math 6]

$$E1(m,x,y) = FE1(|Dis(m-1,x,y) - Dis(m,x,y)| - (ce4 \times |V(m-1,x,y)| \times \Delta t)) \quad (6)$$

In this way, as the distance evaluation value E1(m, x, y), a larger evaluation value is output as a difference between the absolute value of the difference value between the distance value Dis(m−1, x, y) and the distance value Dis(m, x, y) and the absolute value of a distance value considering a moving distance (V(m−1, x, y)×$\Delta t$)) of a target object is smaller. Note that the distance evaluation value E1(m, x, y) may be calculated with ce4 set to 0. In this case, as the distance evaluation value E1(m, x, y), a larger evaluation value is output as the absolute value of the difference value between the distance value Dis(m−1, x, y) and the distance value Dis(m, x, y) is smaller. In this case, it is possible to calculate the distance evaluation value E1(m, x, y) even when information concerning V(m−1, x, y) is absent.

As it is seen from Expression (6), for example, when ce2 and ce3 are set to 0, when the absolute value of the difference value between the distance value Dis(m−1, x, y) and the distance value Dis(m, x, y) is equal to or smaller than the predetermined value based on the time difference $\Delta t$, that is, the distance value based on the absolute value of the moving distance (V(m−1, x, y)×$\Delta t$)), the determination circuit 226 is capable of determining that the time-series luminance signal B(m−1, x, y) is the time-series luminance signal based on the reflected light reflected from the same measurement target. When ce2, ce3, and ce4 are set to 0, the determination circuit 226 is capable of determining, on the basis of correlation between the distance value Dis(m−1, x, y) and the distance value Dis(m, x, y), whether the time-series luminance signal B(m−1, x, y) is the time-series luminance signal based on the reflected light reflected from the same measurement target. That is, when the absolute value of the difference value between the distance value Dis(m−1, x, y) and the distance value Dis(m, x, y) is equal to or smaller than the predetermined value, the determination circuit 226 is capable of determining whether the time-series luminance signal B(m−1, x, y) is the time-series luminance signal based on the reflected light reflected from the same measurement target.

The peak evaluation value E2(m, x, y) is an evaluation value based on a luminance value Lumi(m−1, x, y) and a luminance value Lumi(m, x, y). Lumi(m−1, x, y) is a luminance value of a peak corresponding to the distance value Dis(m−1, x, y). Lumi(m, x, y) is a luminance value of a peak corresponding to the distance value Dis(m, x, y). Details of the peak evaluation value E2(m, x, y) are explained below.

Further, the ambient light evaluation value E3(m, x, y) is an evaluation value based on a cumulative value At(m−1, x, y)(T) and a cumulative value At(m, x, y)(T) indicating magnitudes of ambient light. The cumulative value At(m−1, x, y)(T) is information concerning ambient light corresponding to the time-series luminance signal B(m−1, x, y). The cumulative value At(m, x, y)(T) is information concerning ambient light corresponding to the time-series luminance signal B(m, x, y). Details of the ambient light evaluation value E3(m, x, y) are explained below. Note that the cumulative value At(m−1, x, y)(T) according to this embodiment corresponds to a value concerning first ambient light. The cumulative value At(m, x, y)(T) according to this embodiment corresponds to a value concerning second ambient light.

Figure 15A:
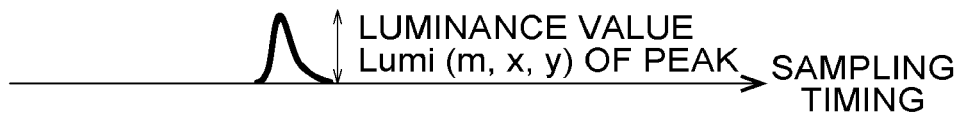
FIGS. 15A to 15C depict diagrams showing examples of time-series luminance signals of a present frame and time-series luminance signals of a preceding frame.
Figure 15B:
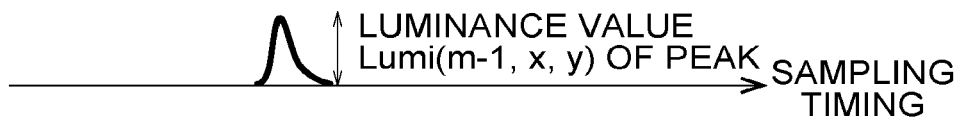
Figure 15C:
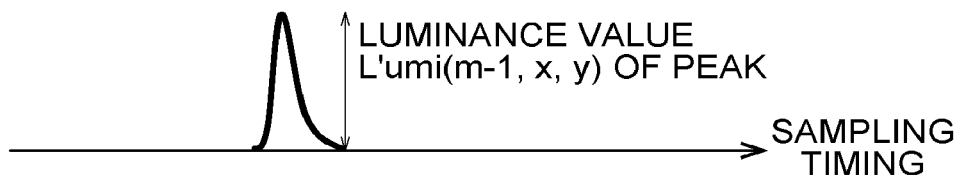

Details of the peak evaluation value E2(m, x, y) are explained with reference to FIGS. 15A to 15C. FIGS. 15A to 15C are diagrams showing examples of the time series luminance signal B(m, x, y) of the present frame and the time-series luminance signal B(m−1, x, y) of the preceding frame. The horizontal axis indicates sampling timing and the vertical axis indicates a luminance signal value.

FIG. 15A shows the luminance value Lumi(m, x, y) of the peak based on the time-series luminance signal B(m, x, y). FIG. 15B shows the luminance value Lumi(m−1, x, y) of the peak in the time-series luminance signal B(m−1, x, y) obtained on the basis of the same measurement target 10. FIG. 15C shows a luminance value L'umi(m−1, x, y) of the peak in a time-series luminance signal B'(m−1, x, y) obtained on the basis of a different target object.

As shown in FIGS. 15A and 15B, the luminance value Lumi(m, x, y) and the luminance value Lumi(m−1, x, y) of the peaks based on the reflected light reflected from the same measurement target 10 tend to indicate the same value. On the other hand, as shown in FIG. 15C, the luminance value Lumi(m, x, y) of the peak and the luminance value L'umi(m−1, x, y) based on the reflected light reflected from the different measurement target 10 tend to indicate different values.

Accordingly, as indicated by Expression (6), the determination circuit 226 performs determination on the basis of correlation between the luminance value Lumi(m, x, y) and the luminance value Lumi(m−1, x, y). That is, the determination circuit 226 calculates the peak evaluation value E2(m, x, y) that outputs a larger value as values of the luminance value Lumi(m, x, y) and the luminance value Lumi(m−1, x, y) come closer to each other. A function FE2(x) is, for example, a nonlinear function indicating a maximum value when x is 1 and having a smaller value as a value of x further deviates from 1. Consequently, the peak evaluation value E2(m, x, y) indicates a highest value when a ratio of the luminance value Lumi(m, x, y) of the peak and the luminance value Lumi(m−1, x, y) of the peak is 1 and indicates a smaller value as the ratio further deviates from 1. Lumi(m, x, y) is stored in the storage circuit 21.

[Math 7]

$$E2(m, x, y) = FE2\left(\frac{Lumi(m-1, x, y)}{Lumi(m, x, y)}\right) \tag{7}$$

As indicated by Expression (8), it is also possible to add an offset α and a minimum value β to the function FE2(x) rather than a simple ratio.

[Math 8]

$$E2(m, x, y) = FE2\left(\frac{Max(Lumi(m-1, x, y) + \alpha, \beta)}{Max(Lumi(m, x, y) + \alpha, \beta)}\right) \tag{8}$$

Figure 16A:
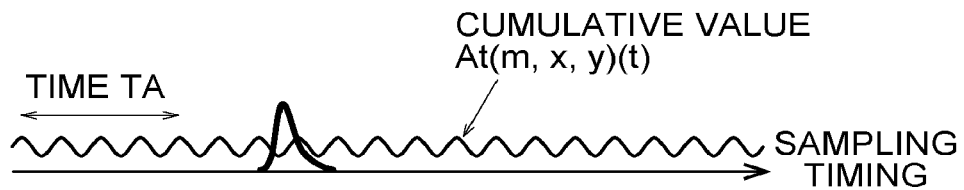
FIGS. 16A to 16C depict diagrams showing examples of cumulative values of the present frame and cumulative values of the preceding frame.
Figure 16B:
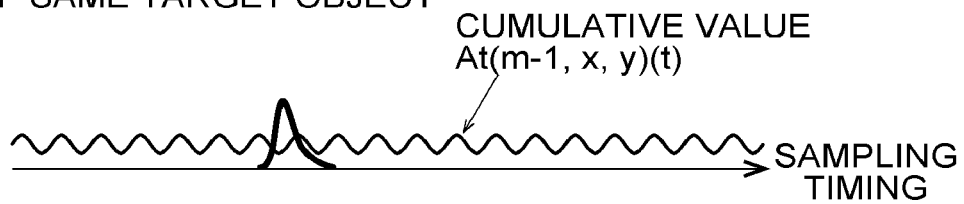
Figure 16C:
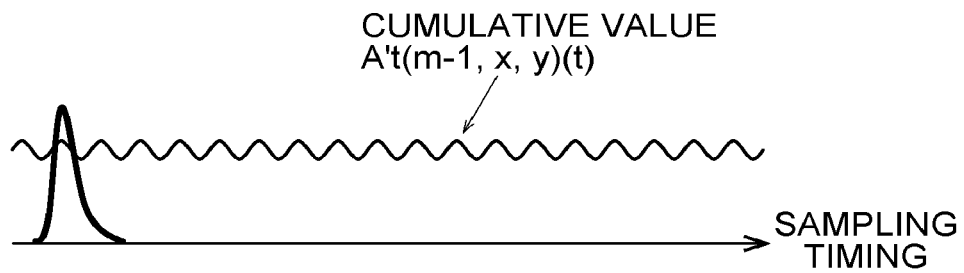

Details of the ambient light evaluation value E3(m, x, y) are explained with reference to FIGS. 16A to 16C. FIGS. 16A to 16C are diagrams for explaining examples of a cumulative value At(m, x, y)(t) of the time-series luminance signal B(m, x, y) of the present frame and a cumulative value At(m−1, x, y)(t) of the time-series luminance signal B(m−1, x, y) of the preceding frame. The horizontal axis indicates sampling timing and the vertical axis indicates a luminance signal value. The cumulative value At(m, x, y)(t) is a value that fluctuates according to the magnitude of ambient light and is an example of information concerning ambient light.

FIG. 16A is a diagram showing the cumulative value At(m, x, y)(t) based on the time-series luminance signal B(m, x, y). A time range TA indicated by arrows indicates a time range in which accumulation is performed. The cumulative value At(m, x, y) in FIG. 16A indicates a result obtained by performing accumulation of the time-series luminance signal B(m, x, y) while moving the time range TA in order from 0 to an end time of sampling as indicated by Expression (9). B(m, x, y) and B(m−1, x, y) are represented by B(m, x, y)(t) and B(m−1, x, y)(t) as functions of the sampling timing t.

[Math 9]

$$At(m, x, y)(t) = K1 \times \int_{t-TA/2}^{t+TA/2} B(m, x, y)(t)dt \tag{9}$$

[Math 10]

$$At(m-1, x, y)(t) = K1 \times \int_{t-TA/2}^{t+TA/2} B(m-1, x, y)(t)dt \tag{10}$$

FIG. 16B shows the cumulative value At(m−1, x, y)(t) of the time-series luminance signal B(m−1, x, y) obtained on the basis of the same measurement target 10 as indicated by Expression (10). FIG. 16C shows a cumulative value A't(m−1, x, y)(t) in the time series luminance signal BT(m−1, x, y) obtained on the basis of a different target object.

As shown in FIGS. 16A and 16B, the cumulative value At(m−1, x, y)(t) of the time-series luminance signal B(m−1, x, y) based on the reflected light reflected from the same measurement target 10 tends to be equal to the cumulative value At(m, x, y)(t) of the time-series luminance signal B(m, x, y). On the other hand, as shown in FIGS. 16A and 16C, the cumulative value A't(m−1, x, y)(t) of the time-series luminance signal B'(m−1, x, y) based on reflected light reflected from a different object tends to have a value different from the cumulative value At(m, x, y)(t).

Accordingly, as indicated by Expression (11), the determination circuit 226 performs determination on the basis of correlation between the cumulative value At(m, x, y)(T) and At(m−1, x, y)(T). That is, the determination circuit 226 calculates an ambient light evaluation value E3(m, x, y) that outputs a larger value as values of the luminance value Lumi(m, x, y) and the luminance value Lumi(m−1, x, y) come closer to each other. A function FE3(x) is, for example, a nonlinear function indicating a maximum value when x is 1 and having a smaller value as a value of x further deviates from 1. Consequently, the ambient light evaluation value E3(m, x, y) indicates a highest value when a ratio of the cumulative value At(m, x, y)(T) and the cumulative value At(m−1, x, y)(T) is 1 and indicates a smaller value as the ratio further deviates from 1. In Expression (11), cumulative values of the time-series luminance signals B(m, x, y)(t) and B(m−1, x, y)(t) measured in any fixed time T are used. That is, At(m, x, y)(T) is stored in the storage circuit 21 as information concerning ambient light.

[Math 11]

$$E3(m, x, y) = FE3\left(\frac{At(m-1, x, y)(T)}{At(m, x, y)(T)}\right) \quad (11)$$

As indicated by Expression (12), it is also possible to add an offset α and a minimum value β to the function FE3(x) rather than a simple ratio.

[Math 12]

$$E3(m, x, y) = FE3\left(\frac{\mathrm{Max}(At(m-1, x, y)(T)+\alpha, \beta)}{\mathrm{Max}(At(m, x, y)(T)+\alpha, \beta)}\right) \quad (12)$$

The above is the explanation of the configuration according to this embodiment. An operation example of the distance measuring device 5 according to this embodiment is explained in detail below.

Figure 17:
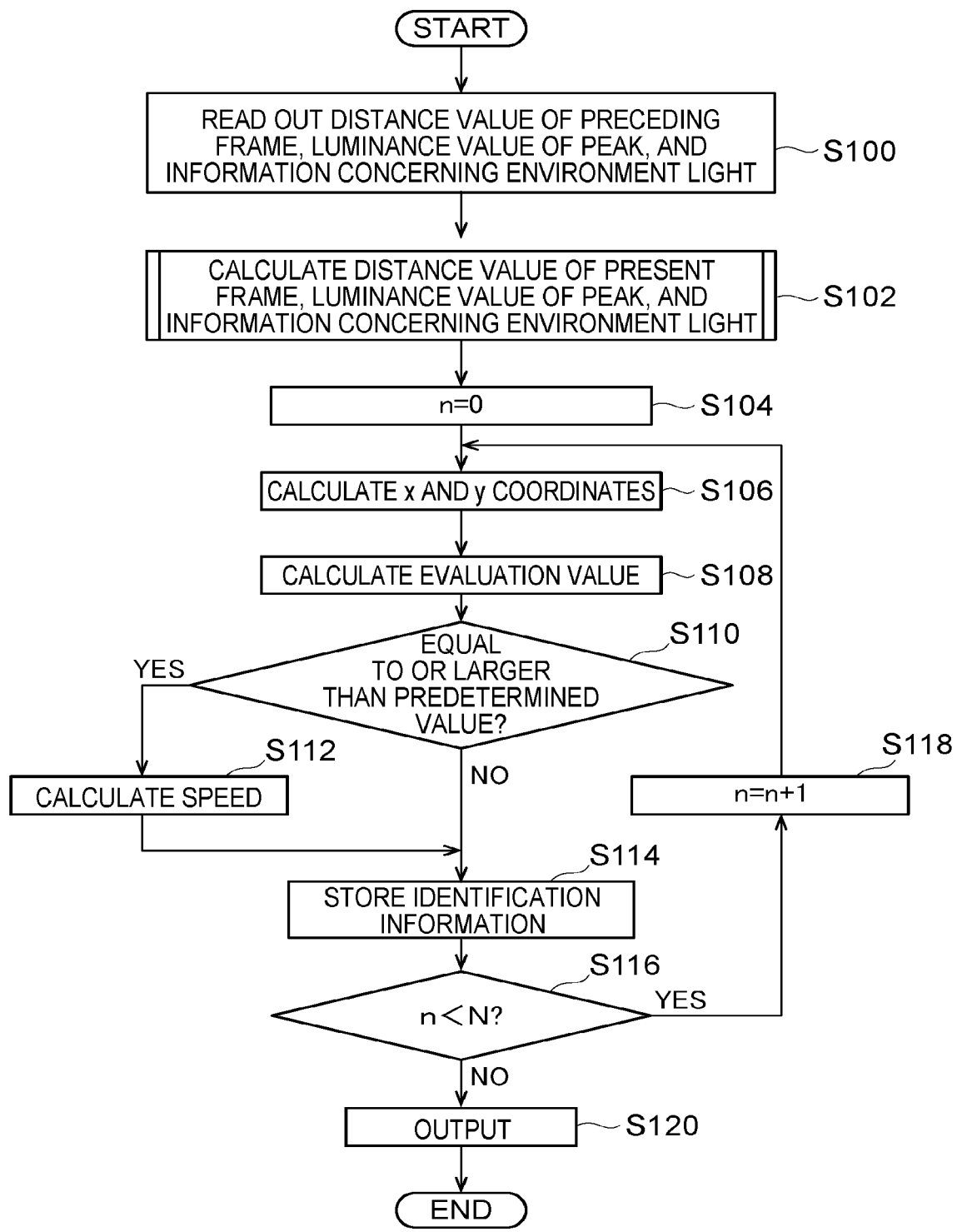
FIG. 17 depicts a flowchart for explaining a processing operation of the distance measuring device.

FIG. 17 is a flowchart for explaining a processing operation of the distance measuring device 5 according to this embodiment.

Figure 18:
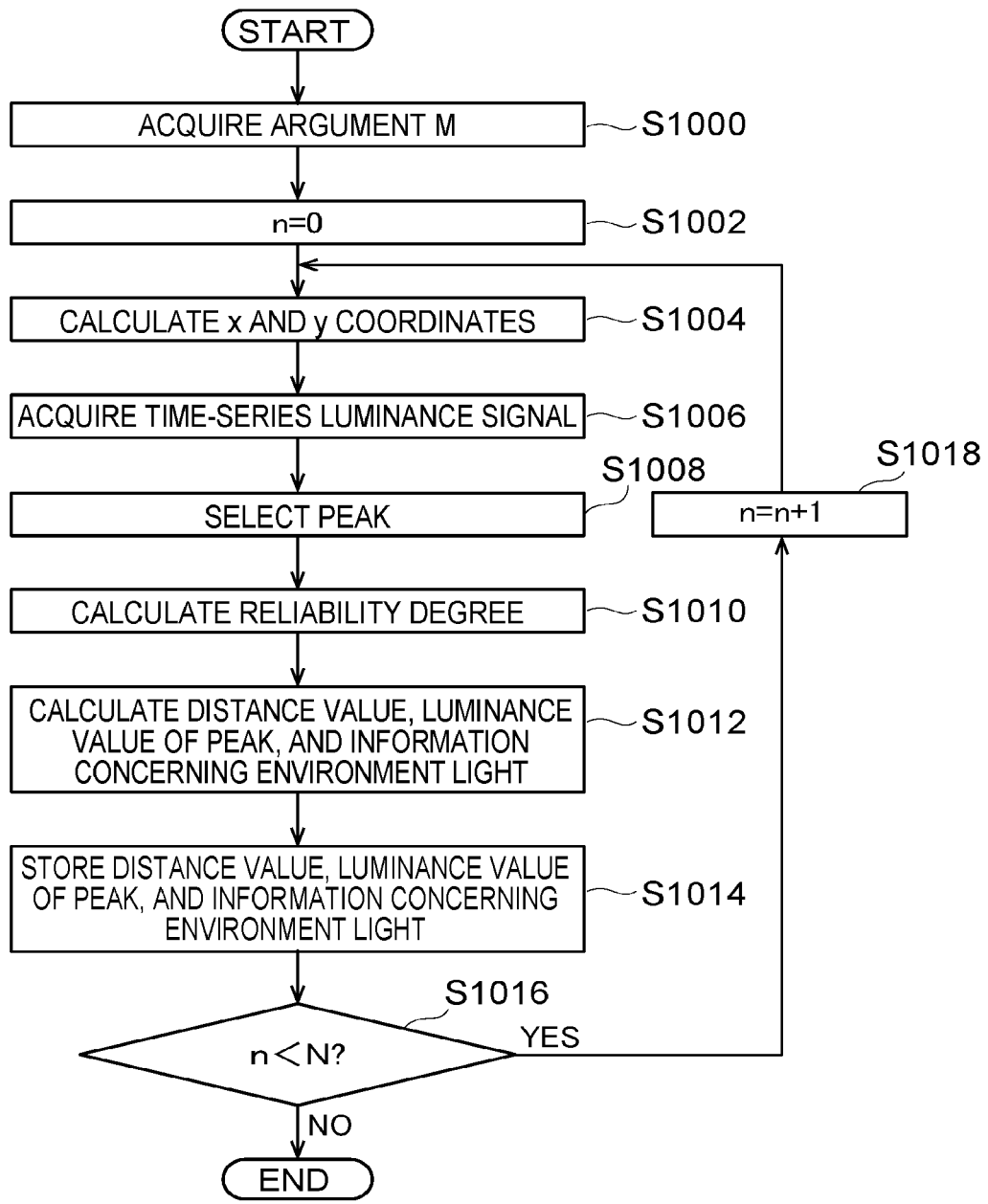
FIG. 18 depicts a flowchart of a subroutine.

FIG. 18 is a flowchart of a subroutine for explaining a processing operation for calculating and storing a distance value, a luminance value of a peak, and information concerning ambient light. A processing operation example of the distance measuring device 5 is explained with reference to FIGS. 17 and 18. A processing example after the signal generation circuit 20 generates the time-series luminance signal B is explained.

As shown in FIG. 17, the signal processing circuit 22 (FIG. 10) reads out, from the storage circuit 21, the distance value Dis(m−1, x, y) (0≤x<HN, 0≤y<VN) of the preceding frame, the luminance value Lumi(m−1, x, y) of the peak, and the cumulative value At(m−1, x, y)(T) (0≤x<HN, 0≤y<VN), which is the information concerning the ambient light, and retains the distance value Dis(m−1, x, y), the luminance value Lumi(m−1, x, y) of the peak, and the cumulative value At(m−1, x, y) (step S100). When the distance value Dis(m−1, x, y), the luminance value Lumi(m−1, x, y) of the peak, the cumulative value At(m−1, x, y), and the like are not stored, the signal processing circuit 22 passes an argument M=m−1 to a subroutine (FIG. 18) and calculates the distance value Dis(m−1, x, y), the luminance value Lumi(m−1, x, y) of the peak, the cumulative value At(m−1, x, y), and the like.

Subsequently, the signal processing circuit 22 passes an argument M=m to the subroutine (FIG. 18), calculates the distance value Dis(m, x, y) (0≤x<HM, 0≤y<VN) of the present frame, the luminance value Lumi(m, x, y) (0≤x<HM, 0≤y<VN) of the peak, and the cumulative value At(m, x, y)(T) (0≤x<HM, 0≤y<VN), which is the information concerning the ambient light, and retains the distance value Dis(m, x, y), the luminance value Lumi(m, x, y) of the peak, and the cumulative value At(m, x, y)(T) in the storage circuit 21 (step S102).

Subsequently, the determination circuit 226 (FIG. 10) of the signal processing circuit 22 sets 0 in "n" (step S104) and calculates an x coordinate and a y coordinate (step S106). The determination circuit 226 calculates the x coordinate and the y coordinate as x=n−[n÷HN]×HN and y=[n÷HN].

Subsequently, the determination circuit 226 calculates the evaluation value E(m, x, y) indicated by Expression (5) (step S108). Subsequently, the determination circuit 226 determines whether the evaluation value E(m, x, y) is equal to or larger than the predetermined value The (step S110). When the evaluation value E(m, x, y) is equal to or larger than the predetermined value The (YES in step S110), the determination circuit 226 determines that the time-series luminance signal (m−1, x, y) and the time-series luminance signal (m, x, y) are time-series luminance signals based on reflected light reflected from the same measurement target 10.

Subsequently, the speed calculation circuit 230 (FIG. 10) calculates the relative speed V(m, x, y) on the basis of the distance value Dis(m−1, x, y) and the distance value Dis(m, x, y) and stores the relative speed V(m, x, y) in the storage circuit 21 (step S112).

On the other hand, when the evaluation value E(m, x, y) is not equal to or larger than the predetermined value The (NO in step S110), the determination circuit 226 determines that the time-series luminance signal (m−1, x, y) and the time-series luminance signal (m, x, y) are not time-series luminance signals based on reflected light reflected from the same measurement target. Subsequently, the determination circuit 226 stores, in the storage circuit 21, identification information Id(m, x, y) indicating whether the time-series luminance signal (m−1, x, y) and the time-series luminance signal (m, x, y) are time-series luminance signals based on reflected light reflected from the same measurement target (step S114).

Subsequently, the determination circuit 226 determines whether "n" is smaller than N (step S116). When determining that "n" is smaller than N (YES in step S116), the determination circuit 226 adds 1 to "n" (step S118) and repeats the processing from step S106.

On the other hand, when not determining that "n" is smaller than N (NO in step S116), the determination circuit 226 outputs identification information associated with the coordinate (x, y) to the measurement information processing device 400 (step S120) and ends the entire processing.

As shown in FIG. 18, the signal processing circuit 22 (FIG. 10) acquires a value of the argument M (step S1000). Subsequently, the signal processing circuit 22 sets 0 in "n"

(step S1002) and calculates an x coordinate and a y coordinate (step S1004). The signal processing circuit 22 calculates the x coordinate and the y coordinate as x=n−[n÷HN]×HN and y=[n÷HN].

Subsequently, the selection circuit 220 (FIG. 10) of the signal processing circuit 22 acquires the time-series luminance signal B(M, x, y) (step S1006) and selects PN peaks (step S1008). Subsequently, the reliability-degree generation circuit 222 generates the reliability degree R1(p, M, x, y) (0≤p<PN) for each of the peaks selected by the selection circuit 220 (step S1010).

Subsequently, the measurement processing circuit 224 (FIG. 10) calculates a distance value Dis(M, x, y) and a luminance value Lumi(M, x, y) and the determination circuit 226 (FIG. 10) calculates a cumulative value At(M, x, y)(T) (step S1012). The measurement processing circuit 224 selects a peak indicating a maximum value from the reliability degree R1(p, M, x, y) (0≤p<PN) and calculates a distance value Dis(M, x, y) and a luminance value Lumi(M, x, y).

Subsequently, the measurement processing circuit 224 stores the distance value Dis(M, x, y), the luminance value Lumi(M, x, y), and the cumulative value At(M, x, y)(T) in the storage circuit 21 (step S1014).

Subsequently, the signal processing circuit 22 determines whether "n" is smaller than N (step S1016). When determining that "n" is smaller than N (YES in step S1016), the signal processing circuit 22 adds 1 to "n" (step S1018) and repeats the processing from step S1004.

On the other hand, when determining that "n" is not smaller than N (NO in step S1016), the signal processing circuit 22 ends the entire processing.

As explained above, in accordance with the present embodiment, the signal processing circuit 22 calculates the distance value Dis(m−1, x, y) of the preceding frame, the luminance value Lumi(m−1, x, y) of the peak, the cumulative value At(m−1, x, y)(T), which is the information concerning the ambient light, the distance value Dis(m, x, y) of the present frame, the luminance value Lumi(m, x, y) of the peak, and the cumulative value At(m, x, y)(T), which is the information concerning the ambient light. Subsequently, the determination circuit 226 calculates the evaluation value E(m, x, y) indicated by Expression (5) and, when the evaluation value E(m, x, y) is equal to or larger than the predetermined value The, determines that the time-series luminance signal (m−1, x, y) and the time-series luminance signal (m, x, y) are time-series luminance signals based on reflected light reflected from the same measurement target 10. When it is determined that the time-series luminance signal (m−1, x, y) and the time-series luminance signal (m, x, y) are time-series luminance signals based on reflected light reflected from the same measurement target 10, the speed calculation circuit 230 calculates the relative speed V(m, x, y). In this way, when it is determined that the time-series luminance signal (m−1, x, y) and the time-series luminance signal (m, x, y) are time-series luminance signals based on reflected light reflected from the same measurement target 10, the speed calculation circuit 230 calculates the relative speed V(m, x, y). Therefore, it is possible to more highly accurately calculate the relative speed V(m, x, y).

The discrimination information retained in the storage circuit 21 is output from the distance measuring device 5 to an external circuit, for example, the measurement information processing device 400 and the driving supporting device 500 via the output interface 23 together with a distance of a distance measurement result. Accordingly, it is possible to calculate speed from a difference between the distance value B(m−1, x, y) and the distance value B(m, x, y) after the output. In this case, the distance measuring device 5 does not need to calculate speed. In particular, in the memory saving mode, when the discrimination information is 1 bit, transfer to the external circuit is negligible. As explained below in a second embodiment, it is possible to perform object recognition on the basis of the discrimination information. In making a decision based on the correlation, an exception can be provided to overturn the decision by a certain method.

Modification of the First Embodiment

The driving supporting system 1 according to a modification of the first embodiment is different from the driving supporting system 1 according to the first embodiment in that the mirror 15 of the distance measuring device 5 is driven at higher speed. The differences from the driving supporting system 1 according to the first embodiment are explained below.

Figure 19:
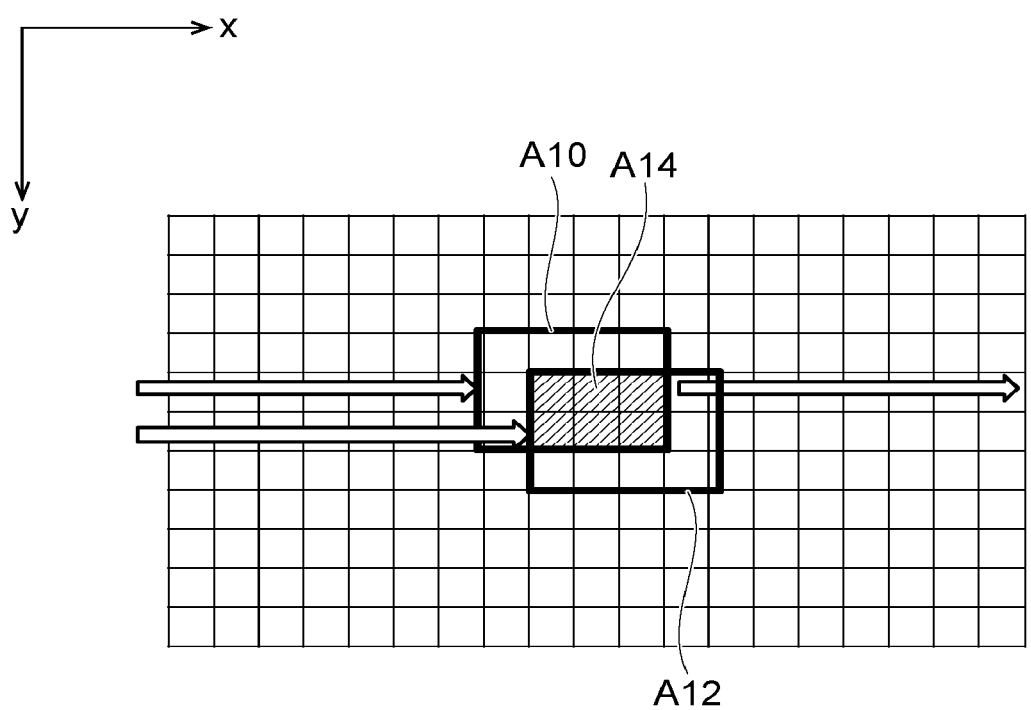
FIG. 19 depicts a schematic diagram enlarging and showing irradiation positions of laser lights on the measurement target in a high-speed frame.

FIG. 19 is a schematic diagram enlarging and showing irradiation positions of laser lights on a measurement target in a high-speed frame. An example in which irradiation ranges of the laser lights L1 overlap in one frame is explained with reference to FIG. 19. As shown in FIG. 19, after the laser light L1 irradiates an area A10, the laser light L1 irradiates an area A12. Accordingly, an area A14 where the area A10 and the area A12 overlap is formed. A device of the mirror 15 (FIG. 2) according to the modification of the first embodiment is configured by, for example, a MEMES (Micro Electro Mechanical).

Accordingly, in the area A14, a time-series luminance signal Bs(ms−1, x, y) (0≤x<SHN, 0≤y<SVN) at the time when the area A10 is irradiated and a time-series luminance signal Bs(ms, x, y) (0≤x<SHN, 0≤y<SVN) at the time when the area A12 is irradiated are generated. Here, ms indicates a frame number of the area A14, SHN indicates a coordinate range in the horizontal direction of the area A14, and SVN indicates a coordinate range in the vertical direction of the area A14. That is, the time-series luminance signal B(m−1, x, y) (0≤x<HN, 0≤y<VN) can be replaced with the time-series luminance signal Bs(ms−1, x, y) (0≤x<SHN, 0≤y<SVN). The time-series luminance signal B(m, x, y) (0≤x<HN, 0≤y<VN) can be replaced with the time-series luminance signal Bs(ms, x, y) (0≤x<SHN, 0≤y<SVN). For example, when a difference between light emission timing of laser light corresponding to the time-series luminance signal Bs(ms−1, x, y) and light emission timing of the laser light corresponding to the time-series luminance signal Bs(ms, x, y) is 10 milliseconds and the relative speed V of the measurement target 10 is 40 kilometers per hour, a distance difference is 11.1 centimeters, which is within measurement accuracy of the distance measuring device 5.

As explained above, according to this modification, the overlapping area A14 is generated in one frame. Consequently, in the area A14, it is possible to obtain measurement values equivalent to the measurement values of the distance measuring device 5 according to the first embodiment within an irradiation time of one frame. That is, it is possible to obtain the identification information T(ms, x, y) (0≤x<SHN, 0≤y<SVN), the distance value Dis(ms−1, x, y) (0≤x<SHN, 0≤y<SVN), the distance value Dis(ms, x, y) (0≤x<SHN, 0≤y<SVN), the relative speed V(ms, x, y) (0≤x<SHN, 0≤y<SVN) calculated by the speed calculation circuit 230, and the like. In this way, the time-series luminance signal Bs(ms, x, y) and the time-series luminance signal Bs(ms−1, x, y) based on the reflected light from the same measurement target can be used for the calculation of the relative speed V(ms, x, y). It is possible to obtain the relative speed V(ms, x, y) at higher speed.

Second Embodiment

The driving supporting system 1 according to a second embodiment is different from the driving supporting system 1 according to the first embodiment in that the driving supporting system 1 according to the second embodiment further includes a second distance measurement circuit 300b that measures the distance to the measurement target 10 on the basis of a measurement signal obtained by converting the reflected light L2 of the laser light L1 into a signal with a time to digital converter (TDC) without using an AD converter 20b.

The driving supporting system 1 according to the second embodiment is different from the driving supporting system 1 according to the first embodiment in that the measurement information processing device 40 includes a storage circuit 40a, a recognition processing circuit 40b, and the speed calculation circuit 230. The differences from the driving supporting system 1 according to the first embodiment are explained below. That is, the driving supporting system 1 according to the second embodiment is different from the driving supporting system 1 according to the first embodiment in that the AD converter 20b is used in the first distance measurement circuit 300a according to the first embodiment but a first TDC 26b and a second TDC 26d, which are time to digital converters, are used for generation of a signal in the second distance measurement circuit 300b according to this embodiment.

Figure 20:
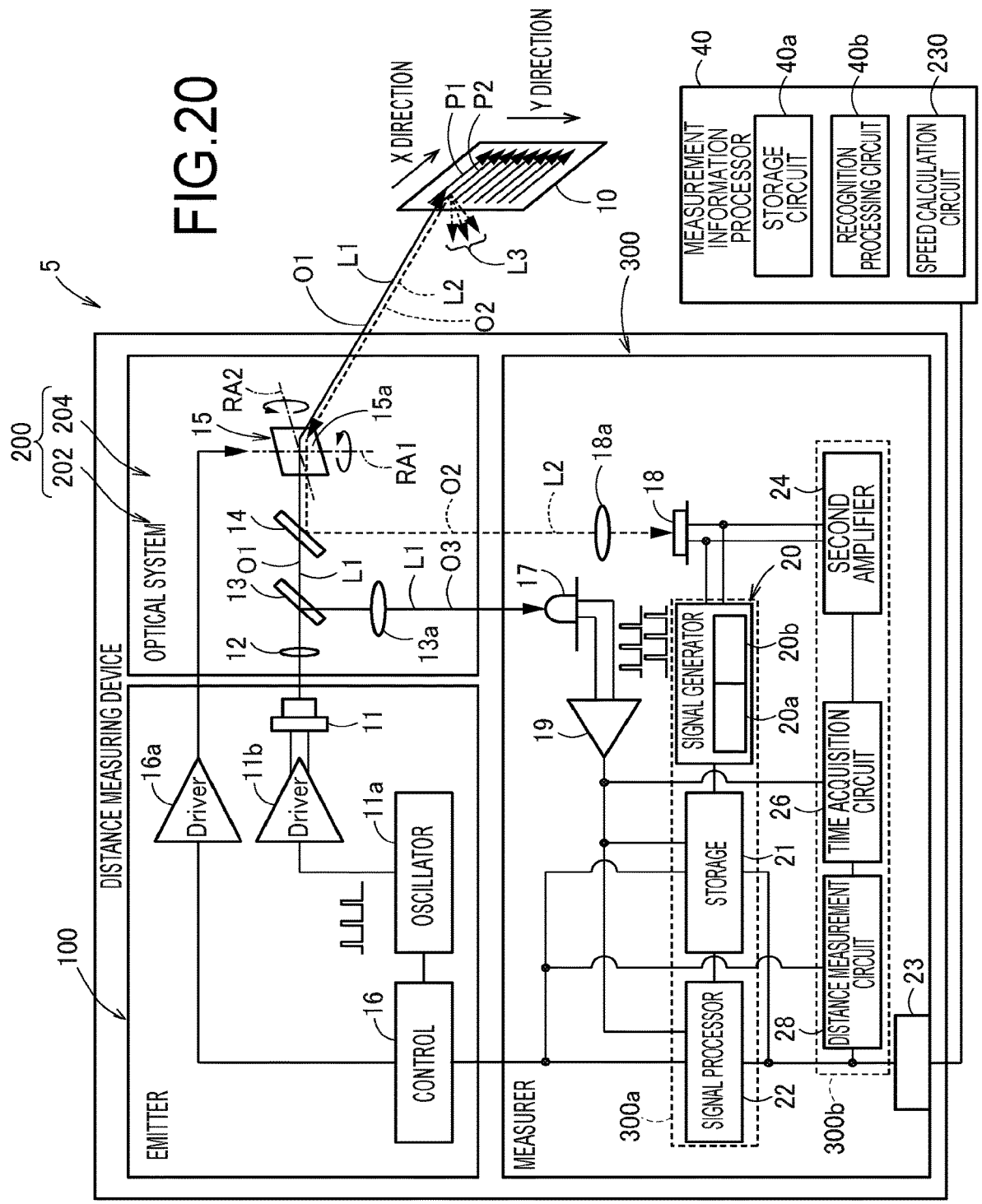
FIG. 20 depicts a diagram showing a configuration example of a distance measuring device according to a second embodiment.

First, a configuration example of the distance measuring device 5 according to this embodiment is explained with reference to FIG. 20. FIG. 20 is a diagram showing a configuration example of the distance measuring device 5 according to the second embodiment. As shown in FIG. 20, the distance measuring device 5 further includes the second distance measurement circuit 300b. The second distance measurement circuit 300b includes a second amplifier 24, a time acquisition circuit 26, and a distance measurement circuit 28. The measurement information processing device 40 includes the storage circuit 40a, the recognition processing circuit 40b, and the speed calculation circuit 230. The speed calculation circuit 230 is provided in the measurement information processing device 40 instead of being provided in the signal processing circuit 22. That is, discrimination information retained in the storage circuit 21 is output from the distance measuring device 5 to the measurement information processing device 40, which is an external device, via the output interface 23 together with a distance of a distance measurement result. In this way, after the discrimination information is output to the measurement information processing device 40, the speed calculation circuit 230 according to this embodiment calculates speed from a difference between the distance value Dis(m−1, x, y) measured by the first distance measurement circuit 300a and the distance value Dis(m, x, y) or a difference between a distance value Dis2(m−1, x, y) measured by the second distance measurement circuit 300b and the distance value Dis(m, x, y). Note that a block diagram of FIG. 20 shows an example of signals. Order of the signals and wiring for the signals are not limited to the example.

Distance measurement accuracy of the second distance measurement circuit 300b is higher than distance measurement accuracy of the first distance measurement circuit 300a when the distance to the measurement target 10 is a short distance, for example, 20 meters or less. Accordingly, the distance measuring device 5 according to this embodiment is different from the distance measuring device 5 according to the first embodiment in that, concerning a measurement distance in the case of the short distance, the distance measuring device 5 according to this embodiment uses a distance value Dis2(m, x, y) (0≤x<HN, 0≤y<VN) measured by the second distance measurement circuit 300b.

The second amplifier 24 is, for example, a transimpedance amplifier and amplifies a measurement signal based on the reflected light L2. The second amplifier 24 amplifiers and converts, for example, a current signal of the sensor 18 into a voltage signal serving as a measurement signal.

The time acquisition circuit 26 acquires a rising time in which a measurement signal obtained by converting reflected light of the laser light L1 into a signal reaches a first threshold and a falling time in which the measurement signal reaches a second threshold after reaching the first threshold.

The distance measurement circuit 28 measures the distance to the measurement target 10 on the basis of a time difference between timing based on a first time obtained by weighting the rising time acquired by the time acquisition circuit 26 with a first weight coefficient and a second time obtained by weighting the falling time acquired by the time acquisition circuit 26 with a second weight coefficient and irradiation timing of the laser light L1.

Details of the time acquisition circuit 26 and the distance measurement circuit 28 are explained with reference to FIGS. 21 and 22.

Figure 21:
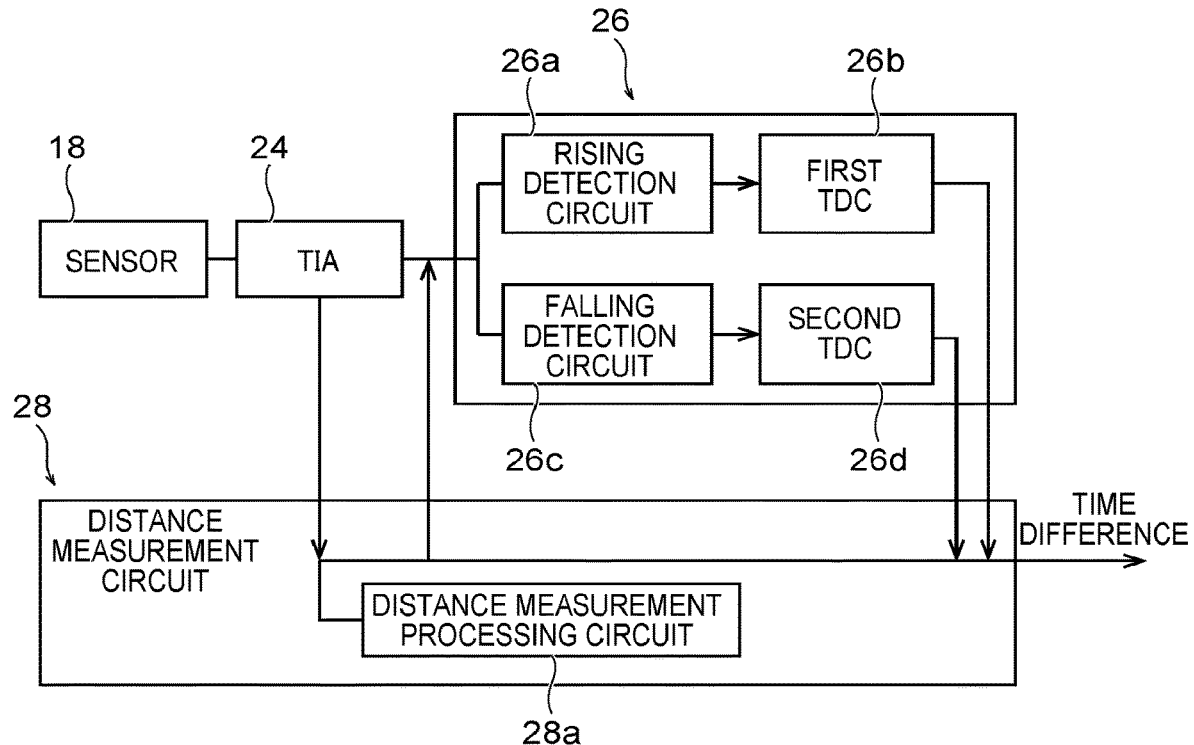
FIG. 21 depicts a block diagram showing detailed configurations of a time acquisition circuit and a distance measurement circuit.

FIG. 21 is a block diagram showing detailed configurations of the time acquisition circuit 26 and the distance measurement circuit 28. As shown in FIG. 21, the time acquisition circuit 26 includes a rising detection circuit 26a, the first TDC 26b, a falling detection circuit 26c, and the second TDC 26d. The distance measurement circuit 28 includes a distance measurement processing circuit 28a. Note that the block diagram of FIG. 21 shows an example of signals. Order of the signals and wiring for the signals are not limited to the example.

Figure 22:
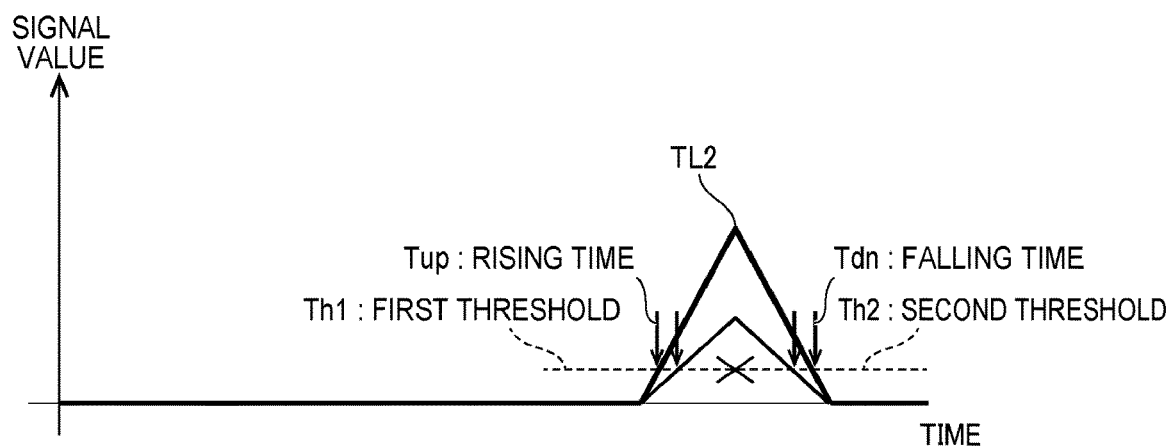
FIG. 22 depicts a diagram showing an example of a rising time and a falling time of a measurement signal by the time acquisition circuit.

FIG. 22 is a diagram showing an example of a rising time and a falling time of a measurement signal by the time acquisition circuit 26. The horizontal axis of FIG. 22 indicates an elapsed time from light emission time of the laser light L1 and the vertical axis of FIG. 22 indicates a signal value of the measurement signal. In FIG. 22, two kinds of signals having different values at peak timing TL2 of the measurement signal are illustrated. A rising time Tup in which the measurement signal reaches a first threshold Th1 and a falling time Tdn in which the measurement signal falls and reaches a second threshold Th2 after reaching the first threshold Th1 are shown respectively for the two kinds of the measurement signals.

As shown in FIG. 21, the rising detection circuit 26a is, for example, a comparator. The rising detection circuit 26a compares a signal value of a measurement signal output by the second amplifier 24 with the first threshold and outputs a rising signal at time when the signal value of the measurement signal exceeds the first threshold. That is, the rising detection circuit 26a outputs the rising signal when the measurement signal reaches the first threshold according to the positive logic.

The first TDC 26b is, for example, a time to digital converter (TDC). The first TDC 26b measures the rising time Tup from when the laser light L1 is emitted until when the rising detection circuit 26a outputs the rising signal. That is, the first TDC 26b acquires the rising time Tup in which the measurement signal obtained by converting the reflected light L2 of the laser light L1 into a signal reaches the first threshold.

The falling detection circuit 26c is, for example, a comparator. The falling detection circuit 26c compares the signal value of the measurement signal output by the second amplifier 24 and the second threshold and outputs a falling signal when the signal value of the measurement signal exceeds the second threshold. That is, the falling detection circuit 26c outputs the falling signal when the measurement signal reaches the second threshold according to the negative logic. For example, the falling detection circuit 26c outputs the falling signal when the signal value of the measurement signal falls and reaches the second threshold after reaching the first threshold. That is, a time in which the falling signal is output corresponds to a time in which the measurement signal reaches the second threshold after reaching the first threshold from emission time of the laser light L1.

The second TDC 26d is, for example, a time to digital converter (TDC). The second TDC 26d measures the falling time Tdn from when the laser light L1 is emitted until when the falling detection circuit 26c outputs a falling signal. That is, the second TDC 26d acquires the falling time Tdn in which a measurement signal obtained by converting reflected light of laser light into a signal reaches the second threshold.

Note that the measurement signal may be reversed into negative to perform the threshold processing. In this case, the rising detection circuit 26a compares the signal value of the measurement signal output by the second amplifier 24 and the first threshold and outputs a rising signal when the signal value of the measurement signal, which changes in time series, decreases as time elapses and exceeds the first threshold. The falling detection circuit 26c compares the signal value of the measurement signal output by the second amplifier 24 and the second threshold and outputs a falling signal when the signal value of the measurement signal, which changes in time series, increases as time elapses and exceeds the second threshold after reaching the first threshold.

The distance measurement circuit 28 includes, for example, an adder, a subtractor, a multiplier, and a divider and measures the distance to a target object on the basis of the rising time Tup (FIG. 22) and the falling time Tdn (FIG. 22) acquired by the time acquisition circuit 26. That is, the distance measurement processing circuit 28a measures the distance to the target object on the basis of a time difference between timing based on a first time obtained by weighting the rising time Tup (FIG. 22) with a first weight coefficient W1 and a second time obtained by weighting the falling time Tdn (FIG. 22) with a second weight coefficient W2 and irradiation timing of laser light. For example, the distance measurement processing circuit 28a acquires timing TL3 corresponding to the peak timing TL2 of the measurement signal on the basis of the first time obtained by weighting the rising time Tup (FIG. 22) with the first weight coefficient W1 and the second time obtained by weighting the falling time Tdn (FIG. 22) with the second weight coefficient W2. That is, the timing TL3 can be indicated by the timing TL3=the first weight coefficient W1×the rising time Tup+the second weight coefficient W2×the falling time Tdn. Since the first threshold Th1 (FIG. 22) according to this embodiment is equal to the second threshold Th2 (FIG. 22), there is a relation of the second weight coefficient W2=(1−the first weight coefficient W1).

In this way, the distance measurement processing circuit 28a measures the distance to the target object on the basis of an equation "the measurement distance=light speed×(the timing TL3−timing TL1 when the photodetector 17 detects the laser light L1)/2". In this way, the measurement distance can be indicated as Expression (13).

[Math 13]

$$\text{Distance value Dis2} = \text{light speed} \times ((W1 \times Tup + (1 - W1) \times Tdn) - TL1)/2 \tag{13}$$

Each of the time acquisition circuit 26 and the distance measurement circuit 28 is configured by hardware. For example, each of the time acquisition circuit 26 and the distance measurement circuit 28 is configured by a circuit. Note that, as explained above, the second threshold Th2 according to this embodiment is set to the same value as the first threshold Th1 in order to simplify calculation of a weight coefficient. However, the second threshold Th2 is not limited to this.

When the measurement distance value Dis2(m, x, y) 0≤x<HN, 0≤y<VN) calculated by the distance measurement processing circuit 28a is equal to or smaller than a predetermined distance Dth1, the determination circuit 226 (FIG. 10) according to this embodiment uses Dis2(m, x, y) (0≤x<HN, 0≤y<VN) for calculation of the distance evaluation value E1(m, x, y) (0≤x<HN, 0≤y<VN). That is, when the distance value Dis2(m, x, y) (0≤x<HN, 0≤y<VN) is equal to or smaller than the predetermined distance Dth1, the determination circuit 226 replaces Dis(m, x, y) (0≤x<HN, 0≤y<VN) of Expression (6) with Dis2(m, x, y) (0≤x<HN, 0≤y<VN) and calculates the distance evaluation value E1(m, x, y) (0≤x<HN, 0≤y<VN). On the other hand, the determination circuit 226 calculates the peak evaluation value E2(m, x, y) (0≤x<HN, 0≤y<VN) and the ambient light evaluation value E3(m, x, y) (0≤x<HN, 0≤y<VN) on the basis of the time-series luminance signals B(m−1, x, y) 0≤x<HN, 0≤y<VN) and B(m, x, y) (0≤x<HN, 0≤y<VN) generated by the signal generation circuit 20. Consequently, the determination accuracy at a short distance is further improved. Dth1 is, for example, 20 meters.

The output circuit 228 (FIG. 10) according to this embodiment outputs the distance value Dis(m, x, y) (0≤x<HN, 0≤y<VN) to the measurement information processing device 400. When the distance value Dis2(m, x, y) calculated by the distance measurement processing circuit 28a is equal to or smaller than the predetermined distance Dth1, the output circuit 228 replaces Dis(m, x, y) with Dis2(m, x, y) and outputs Dis2(m, x, y) via the output interface 23.

The storage circuit 40a has structure equivalent to the structure of the storage circuit 21. The storage circuit 40a stores information included in a signal output by the output interface 23. That is, the storage circuit 40a stores the distance value Dis(m, x, y) (0≤x<HN, 0≤y<VN), the identification information Id(m, x, y) (0≤x<HN, 0≤y<VN), and the like.

The speed calculation circuit 230 calculates the relative speed V(m, x, y) (0≤x<HN, 0≤y<VN) on the basis of a difference between the distance value Dis(m−1, x, y) (0≤x<HN, 0≤y<VN) and the distance value Dis(m, x, y) (0≤x<HN, 0≤y<VN). That is, when the measurement distance value Dis2(m, x, y) calculated by the distance measurement processing circuit 28a is equal to or smaller than the predetermined distance Dth1, the speed calculation circuit 230 according to this embodiment calculates the relative speed V(m, x, y) using Dis2(m, x, y).

A method of calculating speed in a direction y perpendicular to an irradiation direction to an irradiation center Om of the laser light L1 is explained with reference to FIG. 23.

Figure 23:
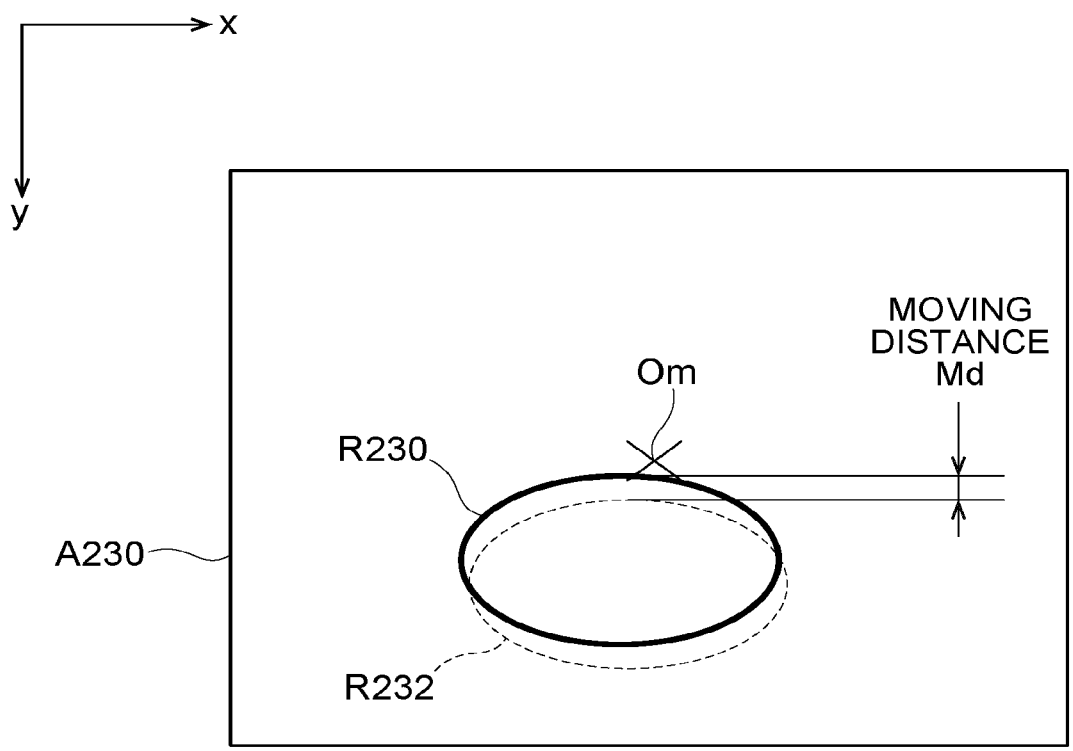
FIG. 23 depicts a diagram showing a recognition result example by a recognition processing circuit.

FIG. 23 is a diagram showing a recognition result example by the recognition processing circuit 40b. A region A230 indicates an irradiation range of the laser light L1. A region R230 indicates a range of the same measurement target recognized by the recognition processing circuit 40b in the preceding frame. A region R232 indicates a range of the same measurement target recognized by the recognition processing circuit 40b in the present frame. A point Om is an irradiation center of the laser light L1.

The recognition processing circuit 40b forms values of the relative speed V(m, x, y) (0≤x<HN, 0≤y<VN) as a two-dimensional speed image and performs clustering with the values of the relative speed. That is, the recognition processing circuit 40b calculates, with clustering processing, a region where the values of the relative speed are in a predetermined range. Consequently, the recognition processing circuit 40b recognizes the clustered region in the speed image as a region of the same measurement target 10. The speed image means an image in which values concerning the relative speed V are two-dimensionally arranged. The values concerning the relative speed V may be a difference value between the distance value Dis(m−1, x, y) (0≤x<HN, 0≤y<VN) and the distance value Dis(m, x, y) (0≤x<HN, 0≤y<VN). Note that the difference value between the distance value Dis(m−1, x, y) and the distance value Dis(m, x, y) according to this embodiment, the relative speed V(m, x, y), and speed obtained by subtracting the speed of the distance measuring device 5 from the relative speed V(m, x, y) correspond to the values concerning the relative speed V.

After the output interface 23 (FIG. 20) outputs the identification information Id(m, x, y) (0≤x<HN, 0≤y<VN), the recognition processing circuit 40b may perform the clustering processing further using the identification information Id. Consequently, it is possible to exclude information concerning a region where the identification information Id=0. Recognition accuracy of the same measurement target on a two-dimensional image is further improved. The measurement information processing device 40 causes the display device 506 to display a distance image, a speed image, and a recognition processing result. The measurement information processing device 40 causes the display device 506 to display, for example, as the recognition processing result, a contour line of the region of the same measurement target obtained in the clustering processing on the distance image, the speed image, or the like.

As shown in FIG. 23, the speed calculation circuit 230 (FIG. 20) according to this embodiment calculates speed in the direction y perpendicular to the irradiation direction to the irradiation center Om of the laser light L1 on the basis of a moving distance Md in the direction y perpendicular to the irradiation center Om of the laser light per predetermined time Δt in the range R232 of the same measurement target recognized by the recognition processing circuit 40b. That is, the speed calculation circuit 230 calculates speed VH in the direction y according to the moving distance Md÷Δt. The moving distance Md is a value obtained by multiplying the distance to the region R232 by θ. θ is an angle of circular measure equivalent to Md and decided by the optical mechanism system 200. More specifically, θ can be calculated according to the positions of pixels and the number of pixels in a speed image corresponding to the moving distance Md.

As explained above, the driving supporting system 1 according to this embodiment further includes the second distance measurement circuit 300b that measures a distance value to the measurement target 10 on the basis of a measurement signal obtained by converting the reflected light L2 of the laser light L1 into a signal. Consequently, when the distance value to the measurement target 10 is equal to or smaller than the predetermined value, it is possible to acquire the second distance value to the measurement target 10 using the second distance measurement circuit 300b and acquire the luminance value of the peak of the time-series luminance signal and the value concerning the second ambient light using the first distance measurement circuit 300a. Accordingly, calculation accuracy of the relative speed V(m, x, y) at the time when the distance value to the measurement target 10 is equal to or smaller than the predetermined value is further improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device that performs processing on a time-series luminance signal generated based on a sensor output, which is a series of values obtained by sampling a temporal change of a reflected light from a measurement target of laser light at a predetermined sampling interval, the distance measuring device comprising:
a determination circuit configured to (1) obtain a first time-series luminance signal based on reflected light from a first measurement target of the laser light, (2) obtain a second time-series luminance signal based on reflected light from a second measurement target of the laser light, (3) calculate a first value concerning first ambient light by calculating a first cumulative value of the first time-series luminance signal over a first predetermined period, (4) calculate a second value concerning second ambient light by calculating a second cumulative value of the second time-series luminance signal over a second predetermined period, (5) calculate a third value being a function of a ratio or difference of the first value and the second value, and (6) determine whether the first measurement target and the second measurement target are a same measurement target based on the calculated third value.

2. The distance measuring device according to claim 1, wherein, when an absolute value of a difference between a first distance value to the first measurement target obtained based on the first time-series luminance signal and a second distance value to the second measurement target obtained based on the second time-series luminance signal is equal to or smaller than an absolute value of a moving distance based on a time difference between irradiation timing of first laser light corresponding to the first time-series luminance signal and irradiation timing of second laser light corresponding to the second time-series luminance signal, the determination circuit is configured to determine that the first measurement target and the second measurement target are the same measurement target.

3. The distance measuring device according to claim 1, wherein the determination circuit is further configured to determine that the first measurement target and the second measurement target are the same measurement target when there is a correlation between the first ambient light and a luminance value of a first peak corresponding to the first time-series luminance signal, and the second ambient light and a luminance value of a second peak corresponding to the second time-series luminance signal.

4. The distance measuring device according to claim 1, wherein the determination circuit is further configured to perform the determination based on a correlation between a first distance value to the first measurement target obtained based on the first time-series luminance signal and a second distance value to the second measurement target obtained based on the second time-series luminance signal, a correlation between a luminance value of a first peak in the first time-series luminance signal corresponding to the first distance value and a luminance value of a second peak in the second time-series luminance signal corresponding to the second distance value, and the correlation between the first value concerning the first ambient light corresponding to the first time-series luminance signal and the second value concerning the second ambient light corresponding to the second time-series luminance signal.

5. The distance measuring device according to claim 4, further comprising:
a first distance measurement circuit configured to measure the second distance value to the second measurement target based on the second time-series luminance signal obtained by analog-digital converting a measurement signal obtained by converting the reflected light of the laser light into a signal; and
a second distance measurement circuit configured to measure the second distance value to the second measurement target based on the measurement signal obtained by converting the reflected light of the laser light into a signal, wherein
when the second distance value to the second measurement target is equal to or smaller than a predetermined value, the distance measuring device is configured to acquire the second distance value to the second measurement target using the second distance measurement circuit and acquire a luminance value of the second peak of the second time-series luminance signal and a value concerning the second ambient light using the first distance measurement circuit.

6. The distance measuring device according to claim 5, wherein
the laser light irradiates an overlapping area in one frame, and
at least the first distance value among the first distance value, the luminance value of the first peak, and the value concerning the first ambient light and at least the second distance value among the second distance value, the luminance value of the second peak, and the value concerning the second ambient light are stored in the storage circuit in one frame.

7. The distance measuring device according to claim 1, further comprising an output circuit configured to output, when it is determined that the first measurement target and the second measurement target are the same measurement target, identification information indicating that the first measurement target and the second measurement target are the same measurement target.

8. The distance measuring device according to claim 1, further comprising a speed calculation circuit configured to calculate, when it is determined that the first measurement target and the second measurement target are the same measurement target, a value concerning speed of the same measurement target based on a difference between a first distance value to the first measurement target obtained based on the first time-series luminance signal and a second distance value to the second measurement target obtained based on the second time-series luminance signal and a time difference between irradiation timing of first laser light corresponding to the first time-series luminance signal and irradiation timing of second laser light corresponding to the second time-series luminance signal.

9. The distance measuring device according to claim 8, wherein
the first time-series luminance signal is one of time-series luminance signals acquired based on reflected lights of the laser light irradiated a plurality of times in different directions in a preceding frame and the second time-series luminance signal is one of time-series luminance signals acquired based on reflected lights of the laser light irradiated a plurality of times in the different directions in a present frame,
the distance measuring device further comprises:
a storage circuit that stores information concerning a first distance value obtained based on the time-series luminance signals of the preceding frame, and
a selection circuit configured to select, out of peaks in the second time-series luminance signal, second peaks within an integral filter range determined by a round-trip time of the laser beam corresponding to the first distance value, as candidates of the second distance value, and
wherein the selection circuit is configured to set widths of the integral filter ranges using relative speeds based on distance values difference between the first distance value, and second distance values corresponding to each of the second peaks.

10. The distance measuring device according to claim 9, wherein the selection circuit is further configured to select, as first selection peaks, a predetermined number of peaks in descending order of peak values of the second time-series luminance signal and further selects, as the second peaks, peaks based on the first distance value and the relative speeds.

11. The distance measuring device according to claim 10, wherein the selection circuit is further configured to narrow the widths of the integral filter ranges as the relative speeds decrease.

12. The distance measuring device according to claim 11, further comprising:
a reliability-degree generation circuit configured to generate reliability degrees for each of the first selection peaks and the second selection peaks; and
a measurement processing circuit configured to generate the second distance value based on a peak corresponding to a reliability degree indicating a maximum value among the reliability degrees for each of the first selection peaks and the second selection peaks.

13. The distance measuring device according to claim 12, wherein the reliability-degree generation circuit is further configured to acquire the time-series luminance signal of the present frame irradiated in a direction within a predetermined range from an irradiation direction of the laser light corresponding to the second time-series luminance signal and generate, based on luminance values of the peaks for each of the time-series luminance signals of the present frame included in a second distance range corresponding to each of the peaks selected by the selection circuit, the reliability degree for each of the selected peaks.

14. The distance measuring device according to claim 13, wherein the third distance range is reduced as the value concerning the speed decreases.

15. The distance measuring device according to claim 12, wherein the reliability-degree generation circuit is further configured to acquire the time-series luminance signal of the preceding frame irradiated in a direction within a predetermined range from an irradiation direction of the laser light corresponding to the second time-series luminance signal, select a distance value for each of the time-series luminance signals of the preceding frame included in a third distance range corresponding to each of the peaks selected by the selection circuit, and generate, based on a luminance value of a peak corresponding to the selected distance value, the reliability degree for each of the selected peaks.

16. The distance measuring device according to claim 9, further comprising a recognition circuit configured to recognize, as a range of the same measurement target, a region where values concerning a speed corresponding to the time-series luminance signals of the present frame are within a predetermined range.

17. The distance measuring device according to claim 16, wherein the speed calculation circuit is further configured to calculate a speed in a direction perpendicular to an irradiation center of the laser light based on a moving distance in the direction perpendicular to the irradiation center of the laser light per predetermined time in the range of the same measurement target.

18. The distance measuring device of claim 9, wherein each frame is a combination of cyclically repeated emissions of the laser.

19. A distance measuring method for performing processing on a time-series luminance signal generated based on a sensor output, which is a series of values obtained by sampling a temporal change of a reflected light from a measurement target of laser light at a predetermined sampling interval, the distance measuring method comprising:
    storing a first time-series luminance signal based on reflected light from a first measurement target of the laser light and a second time-series luminance signal based on reflected light from a second measurement target of the laser light;
    calculating a first value concerning first ambient light by calculating a first cumulative value of the first time-series luminance signal over a first predetermined period;
    calculating a second value concerning second ambient light by calculating a second cumulative value of the second time-series luminance signal over a second predetermined period;
    calculating a third value being a function of a ratio or difference of the first value and the second value; and
    determining whether the first measurement target and the second measurement target are a same measurement target based on the calculated third value.

* * * * *